United States Patent
Wang et al.

(10) Patent No.: US 9,449,026 B2
(45) Date of Patent: Sep. 20, 2016

(54) SKETCH-BASED IMAGE SEARCH

(75) Inventors: Changhu Wang, Beijing (CN); Zhiwei Li, Beijing (CN); Lei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 12/873,007

(22) Filed: Aug. 31, 2010

(65) Prior Publication Data

US 2012/0054177 A1   Mar. 1, 2012

(51) Int. Cl.
*G06F 17/30* (2006.01)
*G06K 9/46* (2006.01)
*G06K 9/00* (2006.01)

(52) U.S. Cl.
CPC ... *G06F 17/30259* (2013.01); *G06F 17/30277* (2013.01); *G06K 9/00402* (2013.01); *G06K 9/4604* (2013.01); *G06K 9/4609* (2013.01); *G06K 9/4671* (2013.01)

(58) Field of Classification Search
CPC ............ G06K 9/6204; G06K 9/6205; G06K 9/6212; G06K 9/6228; G06K 9/6232; G06F 17/30047; G06F 17/30244; G06F 17/30247; G06F 17/30256; G06F 17/30259; G06F 17/30277; G06F 9/00402; G06F 9/00422; G06F 9/46; G06F 9/4604; G06F 9/4609; G06F 9/4671
See application file for complete search history.

(56) References Cited

U.S. PATENT DOCUMENTS

| | | | |
|---|---|---|---|
| 5,734,893 A * | 3/1998 | Li et al. | 707/694 |
| 5,761,655 A * | 6/1998 | Hoffman | |
| 6,044,365 A * | 3/2000 | Cannon et al. | 707/741 |
| 6,243,713 B1 * | 6/2001 | Nelson et al. | |
| 6,463,432 B1 * | 10/2002 | Murakawa | |
| 6,564,263 B1 * | 5/2003 | Bergman et al. | 709/231 |
| 6,574,366 B1 * | 6/2003 | Fan | 382/201 |
| 6,606,623 B1 * | 8/2003 | Hsieh et al. | 707/766 |
| 6,728,752 B1 * | 4/2004 | Chen et al. | 709/203 |
| 6,975,755 B1 * | 12/2005 | Baumberg | 382/154 |
| 7,133,572 B2 * | 11/2006 | Neubauer et al. | 382/282 |
| 7,515,752 B2 | 4/2009 | Tremblay et al. | |

(Continued)

FOREIGN PATENT DOCUMENTS

| EP | 1630723 | 3/2006 |
|---|---|---|
| KR | 20080046490 A | 5/2008 |

OTHER PUBLICATIONS

"Indexed Retrieval by Shape Appearance," by Beretti et al. In: Proc. Vision, Image and Signal Processing (2000). Available at: IEEE.*

(Continued)

*Primary Examiner* — Daniel Kinsaul
(74) *Attorney, Agent, or Firm* — Sandy Swain; Micky Minhas; Lee & Hayes PLLC

(57) ABSTRACT

Sketch-based image search may include receiving a query curve as a sketch query input and identifying a first plurality of oriented points based on the query curve. The first plurality of oriented points may be used to locate at least one image having a curve that includes a second plurality of oriented points that match at least some of the first plurality of oriented points. Implementations also include indexing a plurality of images by identifying at least one curve in each image and generating an index comprising a plurality of oriented points as index entries. The index entries are associated with the plurality of images based on corresponding oriented points in the identified curves in the images.

19 Claims, 19 Drawing Sheets

(56) References Cited

U.S. PATENT DOCUMENTS

| | | | |
|---|---|---|---|
| 7,574,048 B2 | 8/2009 | Shilman et al. | |
| 7,639,250 B2 | 12/2009 | Xu et al. | |
| 7,646,940 B2 | 1/2010 | Chellapilla et al. | |
| 7,761,466 B1* | 7/2010 | Eshghi | 707/772 |
| 8,494,286 B2* | 7/2013 | Capata | G06K 9/00228 382/103 |
| 2003/0194135 A1* | 10/2003 | Wenzel | 382/209 |
| 2003/0200236 A1* | 10/2003 | Hong | 708/200 |
| 2004/0165774 A1* | 8/2004 | Koubaroulis | G06K 9/00409 382/179 |
| 2005/0062740 A1 | 3/2005 | Tobita et al. | |
| 2006/0114252 A1* | 6/2006 | Ramani et al. | 345/419 |
| 2007/0022329 A1* | 1/2007 | Adamek et al. | 714/701 |
| 2008/0187227 A1 | 8/2008 | Bober et al. | |
| 2008/0193020 A1* | 8/2008 | Sibiryakov | G06K 9/00248 382/209 |
| 2008/0243774 A1* | 10/2008 | Jaspers et al. | 707/3 |
| 2009/0254539 A1* | 10/2009 | Wen et al. | 707/5 |
| 2009/0287680 A1* | 11/2009 | Paek et al. | 707/5 |
| 2010/0076959 A1 | 3/2010 | Ramani et al. | |
| 2010/0080469 A1* | 4/2010 | Liu et al. | 382/201 |
| 2010/0322522 A1* | 12/2010 | Wang | G06K 9/6211 382/218 |
| 2011/0302522 A1 | 12/2011 | Cao et al. | |
| 2012/0054177 A1 | 3/2012 | Wang et al. | |
| 2012/0072410 A1 | 3/2012 | Wang et al. | |
| 2013/0127869 A1 | 5/2013 | Winnemoeller et al. | |

OTHER PUBLICATIONS

"Shape Representation Robust to the Sketching Order Using Distance Map and Direction Histogram," by Yun et al. In: Structural, Syntactive, and Statistical Pattern Recognition, vol. 5342/2008 (2008). Available at: SpringerLink.*

"Efficient and Effective Querying by Image Content," by Faloutos et al. In: J'nl of Intelligent Information Systems, vol. 3, No. 3-4 (1994). Available at: SpringerLink.*

"An Image-based, Trainable Symbol Recognizer for Hand-drawn Sketches," by Kara & Stahovich. In: Computers & Graphics, vol. 29, Is. 4 (2005). Available at: Sciencedirect.com.*

Interactive High-Dimensional Index for Large Chinese Calligraphic Character Databases, by Zhuang & Zhuang. In: ACM Trans. Asian Language Information Processing, vol. 6, No. 2 (2007). Available at: http://www.cs.ust.hk/~leichen/papers/talip07-interactive.pdf.*

Content-Based Image Retrieval over the Web Using Query by Sketch and Relevance Feedback, by Di Sciascio et al. In: Visual Information and Information Systems Lecture Notes in Computer Science, vol. 1614, pp. 123-130 (1999). Available at: SpringerLink.*

"Image Retrieval Using Color and Shape," by Jain & Vailaya. In: Pattern Recognition, vol. 29, Is. 8 (1996). Available at: Sciencedirect.com.*

"Query by Image and Video Content: the QBIC System," by Flickner et al. In: Computer, vol. 28, Is. 9 (1995). Available at: IEEE.*

"Multiscale Categorical Object Recognition Using Contour Fragments," by Shotton et al. In: IEEE Trans. Pattern Analysis and Machine Intelligence, vol. 30, No. 7 (2008). Available at: IEEE.*

"Recognizing Objects by Matching Oriented Points," by Johnson & Hebert. In: CMU-RI-TR-96-04 (1996). Available at: http://www.ri.cmu.edu/pub_files/pub2/johnson_andrew_1996_1/johnson_andrew_1996_1.pdf.*

"Automatic Target Recognition by Matching Oriented Edge Pixels," by Olson & Huttenlocher. In: IEEE Trans. Image Processing, vol. 6, No. 1, pp. 103-113 (1997). Available at: IEEE.*

"A Descriptor for Large Scale Image Retrieval Based on Sketched Feature Lines," by Eitz et al. In: Symp. on Sketch-Based Interfaces and Modeling (2009). Available at: http://perso.telecom-paristech.fr/~boubek/papers/SBIR/sbir.pdf.*

"Indexing Visual Representations through the Complexity Map," by Dubuc & Zucker. In: Proc. 5th Int'l Conf. Computer Vision 1995). Available at: IEEE.*

"No Grouping Left Behind: From Edges to Curve Fragments," by Tamrakar & Kimia. In: IEEE 11th Int'l Conf. Computer Vision, 2007. Available at: IEEE.*

"Extracting Salient Curves from Images: An Analysis of the Saliency Network," by Alter & Basri. In: International Journal of Computer Vision Mar. 1998, vol. 27, Issue 1, pp. 51-69. Available at: SpringerLink.*

"Structural Saliency—the Detection of Globally Salient Structures Using a Locally Connected Network," by Ullman & Sha'ashua. In: MIT AI Lab., A.1. Memo No. 1061 (1988). Available at: http://dspace.mit.edu/handle/1721.1/6493#files-area.*

"Boosting Image Retrieval," by Tieu & Viola. In: Int'l J. Computer Vision 56(1/2) (2004). Available at: SpringerLink.*

PCT Search Report mailed Feb. 17, 2012 for PCT application No. PCT/US2011/047817, 11 pages.

Chinese Office Action mailed Nov. 5, 2012 for Chinese patent application No. 201110266398.X, a counterpart foreign application of U.S. Appl. No. 12/873,007, 12 pages.

Wang, et al., "MindFinder: Image Search by Interactive Sketching and Tagging", International World Wide Web Conference Committee 2010, Apr. 26-30, 2010,, Raleigh, NC, USA, pp. 1309-1311.

Yao, et al., "Natural Image Retrieval with Sketches", 2005 IEEE International Conference on Multimedia and Expo (ICME), pp. 1199-1201.

Berretti, et al, "Retrieval by Shape Similarity with Perceptual Distance and Effective Indexing", IEEE Transactions on Multimedia, vol. 2, No. 4, Dec. 1, 2000.

European Office Action mailed Nov. 18, 2015 for European patent application No. 11822334.6, a counterpart foreign application of U.S. Appl. No. 12/873,007, 8 pages.

European Supplementary Search Report mailed Nov. 3, 2015 for European patent application No. 11822334.6, 3 pages.

Jain, et al., "Shape-Based Retrieval: A Case Study with Trademark Image Databases", Pattern Recognition, vol. 31, No. 9, Sep. 1, 1998, pp. 1369-1390.

Nomir, "Hierarchical Dental X-Ray Radiographs Matching", IEEE International Conference on Image Processing, Oct. 1, 2006, pp. 2677-2680.

Lew, "Next-Generation Web Searches for Visual Content", Computer, IEEE, vol. 33, No. 11, Nov. 2000, pp. 46-53.

Office action for U.S. Appl. No. 13/886,862, mailed on Nov. 14, 2014, Wang et al., "Sketch Segmentation", 10 pages.

Office Action for U.S. Appl. No. 13/886,904, mailed Dec. 23, 2014, Wang et al., "Informational Notice to Applicant", 10 pages.

PCT Search Report and Written Opinion mailed Nov. 17, 2014 for PCT Application No. PCT/US14/36471, 12 pages.

Sivic et al., "Video Google: A Text Retrieval Approach to Object Matching in Videos", Proceedings of the Ninth IEEE International Conference on Computer Vision(ICCV 2003), 2-Volume Set, 2003, 8 pages.

Tieu et al., "Boosting Image Retrieval", Kluwer Academic Publisher, 2004, International Journal of Computer Vision 56 (112), pp. #17-pp. #36.

Alvarado, et al., "SketchREAD: A Multi-Domain Sketch Recognition Engine", retrieved on Feb. 9, 2013 at <<http://rationale.csail.mit.edu/publications/Alvarado2004SketchREAD.pdf>>, Proceedings of ACM Symposium on User Interface Software and Technology (UIST), Oct. 24, 2004, pp. 23-32.

Belongie et al., "Shape Matching and Object Recognition Using Shape Contexts", IEEE Transactions on Pattern Analysis and Machine Intelligence, vol. 24, No. 24, Apr. 2002, pp. 509-522.

Blei et al., "Latent Dirichlet Allocation", Journal of Machine Learning Research 3, 2003, pp. 993-1022.

Blei et al., "Modeling Annotated Data", SIGIR'03, Jul. 28-Aug. 1, 2003, Toronto, Canada, 8 pages.

Blei et al., "Supervised Topic Models", Statistical Science, Mar. 3, 2010, 22 pages.

Bober, "MPEG-7 Visual Shape Descriptors", IEEE Transactions on Circuits and Systems for Video Technology, vol. 11, No. 6, Jun. 2001, pp. 716-719.

Borgefors, "Hierarchical Chamfer Matching: A Parametric Edge Matching Algorithm", retrieved on Feb. 9, 2013 at <<http://ieeexplore.ieee.org/stamp/stamp.jsp?tp=&arnumber=9107>>,

(56) References Cited

OTHER PUBLICATIONS

IEEE Transactions on Pattern Analysis and Machine Intelligence, vol. 10, No. 6, Nov. 1988, pp. 849-865.
Boykov, et al., "Graph Cuts and Efficient N-D Image Segmentation", retrieved on Feb. 9, 2013 at <<http://lvelho.impa.br/ip12/reading/ijcv06.pdf>>, International Journal of Computer Vision, vol. 70, No. 2, Nov. 2006, pp. 109-131.
Bronstein, et al., "Shape Google: geometric words and expressions for invariant shape retrieval", retrieved on Feb. 9, 2013 at <<http://visl.technion.ac.il/bron/publications/BroBroOvsGuiTOG10.pdf>>, ACM Transactions on Graphics, vol. 30, No. 1, Jan. 2011, 22 pages.
Cao, et al., "Edgel Index for Large-Scale Sketch-based Image Search", retrieved on Feb. 9, 2013 at <<http://research.microsoft.com/pubs/149199/0630.pdf>>, Proceedings of IEEE Conference on Computer Vision and Pattern Recognition (CVPR), Jun. 20, 2011, pp. 761-768.
Cao, et al., "MindFinder: Interactive Sketch-based Image Search on Millions of Images", retrieved on Feb. 9, 2013 at <<http://bcmi.sjtu.edu.cn/~zhangliqing/Papers/2010ACMMM-SketchSearch-Cao.pdf>>, Proceedings of ACM Intl Conference on Multimedia (MM), Oct. 25, 2010, pp. 1605-1608.
Carreira, et al., "Constrained Parametric Min-Cuts for Automatic Object Segmentation", retrieved on Feb. 9, 2013 at <<http://ieeexplore.ieee.org/stamp/stamp.jsp?tp=&arnumber=5540063>>, IEEE Conference on Computer Vision and Pattern Recognition (CVPR), Jun. 13, 2010, pp. 3241-3248.
Chinese Office Action mailed Jun. 21, 2013 for Chinese patent application No. 201110266398.X, a counterpart foreign application of U.S. Appl. No. 12/873,007, 6 pages.
Danielsson et al., "Generic Object Class Detection using Boosted Configurations of Oriented Edges", School of Computer Science and Communications, Royal Inst. of Technology, Stockholm, Sweden, no publication date, 14 pages.
Dinakaran et al., "Interactive Image Retrieval Using Text and Image Content", Cybernetics and Information Technologies, vol. 10, No. 3, 2010, pp. 20-30.
Eitz et al., "An evaluation of descriptors for large-scale image retrieval from sketched feature lines", Computers & Graphics, TU Berlin, Telecom ParisTech—CNRS LTCI, Jul. 19, 2010, 38 pages.
Felzenszwalb, et al., "Efficient Graph-Based Image Segmentation", retrieved on Feb. 9, 2013 at <<http://cs.brown.edu/~pff/papers/seg-ijcv.pdf>>, Journal of International Journal of Computer Vision, vol. 59, No. 2, Sep. 2004, pp. 167-181.
Fergus et al., "Learning Object Categories from Google's Image Search", In Proceedings of Tenth IEEE International Conference on Computer Vision, vol. 2, Oct. 17, 2005, 8 pages.
Forbus et al., "CogSketch: Open-domain sketch understanding for cognitive science research adn for education", Eurographics Workshop on Sketch-Based Interfaces and Modeling, 2008, 8 pages.
Gao et al., "Visual-Textual Joint Relevance Learning for Tag-Based Social Image Search", IEEE Transactions on Image Processing, vol. 22, No. 1, Jan. 2013, pp. 363-376.
Hammond et al., "A Sketch Recognition Interface that Recognizes Hundreds of Shapes in Course-of-Action Diagrams", In Extended Abstracts on Human Factors in Computing Systems, Apr. 14-15, 2010, pp. 4213-4218.
Hammond, et al., "Ladder, a sketching language for user interface developers", retrieved on Feb. 9, 2013 at <<http://rationale.csail.mit.edu/publications/Hammond2005Ladder.pdf>>, Computers and Graphics, vol. 29, No. 4, Aug. 2005, pp. 518-532.
Hammond et al., "Tahuti: A Geometrical Sketch Recognition System for UML Class Diagrams", In the Proceeding of ACM SIGGRAPH Courses, Article No. 25, 2006, 8 pages.
Hao et al., "Equip Tourists with Knowledge Mined from Travelogues", In Proceedings of the 19th International Conference on World Wide Web, Apr. 26-30, 2010, pp. 401-410.
Hofmann, "Probabilistic Latent Semantic Indexing", In Proceedings of the Twenty-Second Annual International SIGIR Conference Research and Development in Information Retrieval, Aug. 15, 1999, 8 pages.
Kara, "Automatic Parsing and Recognition of Hand-Drawn Sketches for Pen-Based Computer Interfaces", retrieved on Feb. 9, 2013 at <<http://pdf.aminer.org/000/333/925/on_line_hand_drawn_symbol_recognition_based_on_primitives_separation.pdf>>, Thesis for Doctor of Philosophy (Mechanical Engineering), Carnegie Mellon University, Sep. 2004, 176 pages.
La Cascia et al., "Combining Textual and Visual Cues fo rContent-based Image Retrieval on the World Wide Web", IEEE Workshop on Content-based Access of Image and Video Libraries, Jun. 1998, 5 pages.
Ling et al., "Shape Classification Using the Inner-Distance", In IEEE Transactions on Pattern Analysis and Machine Intelligence, vol. 29, Issue 2, Feb. 2007, pp. 286-299.
Marr, "Early Processing of Visual Information", Massachusetts Institute of Technology Artificial Intelligence Laboratory, A.1. Memo No. 340, Dec. 1975, 67 pages.
Marr, "Early Processing of Visual Information", Phil. Trans. R. Soc. Lond. B 1976, 275, Oct. 19, 1976, retrieved from <<rstb.royalsocietypublishing.org>> on Apr. 11, 2013, 44 pages.
Mikolajczyk et al, "Shape Recognition with Edge-Based Features", In British Machine Vision Conference, Dec. 20, 2010, 10 pages.
Mori et al., "Efficient Shape Matching Using Shape Contexts", In IEEE Transactions on Pattern Analysis and Machine Intelligence, vol. 27, Issue 11, Nov. 2005, pp. 1832-1837.
Newman et al., "Denim: Finding a Tighter Fit Between Tools adn Practice for Web Site Design", In Proceedings of the SIGCHI Conference on Human Factors in Comoputing Systems, Jan. 1, 2000, 9 pages.
Paquet et al., "Description of shape information for 2-Dand 3-D Objects", In Proceeding of Signal Processing: Image Communication, vol. 16, Issue 1-2, 2000, pp. 103-122.
Paulson et al., "PaleoSketch: Accurate Primitive Sketch Recognition and Beautification", In Proceedings of the International Conference on Intelligent User Interfaces, retrieved at <<http://scholar.googleusercontent.com/scholar?q=cache:niUE13zqolMJ:scholar.google.com/>> on Feb. 19, 2013, 14 pages.
Pu, et al., "Automated Freehand Sketch Segmentation Using Radial Basis Functions", retrieved on Feb. 9, 2013 at <<http://www.ncbi.nlm.nih.gov/pmc/articles/PMC2782822/pdf/nihms120688.pdf>>, Journal of Computer-Aided Design, vol. 41, No. 12, Dec. 1, 2009, pp. 857-864.
Rosen-Zvi et al., "The Author-Topic Model for Authors and Documents", In Proceedings of the 20th Conference on Uncertainty in Artificial Intelligence, 2004, pp. 487-494.
Sagar, et al., "Content-based Image Retrieval System Implementation Using Sketches", retrieved on Feb. 9, 2013 at <<http://ijrct.org/documents/1000005.pdf>>, International Journal of Research and Computer Science Applications, vol. 2, No. 2, May 2012, 8 pages.
Sebastian et al., "Recognition of Shapes by Editing their Shock Graphs", In IEEE Transactions on Pattern Analysis and Machine Intelligence, vol. 26, Issue 5, May 2004, pp. 550-571.
Sezgin, "Feature Point Detection and Curve Approximation for Early Processing of Free-Hand Sketches", retrieved on Feb. 9, 2013 at <<http://rationale.csail.mit.edu/publications/Sezgin2001Feature.pdf>>, Thesis for Master of Science, Massachusetts Institute of Technology, Department of Electrical Engineering and Computer Science, May 2001, 77 pages.
Sezgin, et al., "HMM-Based Efficient Sketch Recognition", retrieved onn Feb. 9, 2013 at <<http://citeseerx.ist.psu.edu/viewdoc/download?doi=10.1.1.94.6774&rep=rep1&type=pdf>>, Proceedings of Intl Conference on Intelligent User Interfaces (IUI), Jan. 10, 2005, pp. 281-283.
Sezgin, et al., "Sketch Based Interfaces: Early Processing for Sketch Understanding", retrieved on Feb. 9, 2013 at <<http://www.ai.mit.edu/projects/oxygen/oxygen-book2001/Section4-Perceptual-Interfaces/PI-11.pdf>>, Proceedings of Workshop on Perceptual User Interfaces (PUI), May 2001, pp. 623-641.
Shi, et al., "Normalized Cuts and Image Segmentation", retrieved on Feb. 9, 2013 at <<http://ieeexplore.ieee.org/stamp/stamp.jsp?tp=&arnumber=868688>> Transactions on Pattern Analysis and Machine Intelligence (PAMI), vol. 22, No. 8, Aug. 2000, pp. 888-905.

(56) References Cited

OTHER PUBLICATIONS

Stahovich, "Sketchit: A Sketch Interpretation Tool for Conceptual Mechanism Design", In A.I. Tehcnical Report No. 1573, Mar. 1996, 207 pages.

Sun, et al., "Query-Adaptive Shape Topic Mining for Hand-Drawn Sketch Recognition", retrieved on Feb. 9, 2013 at <<http://dl.acm.org/citation.cfm?id=2393347.2393421>>, Proceedings of ACM Intl Conference on Multimedia (MM), Oct. 29, 2012, pp. 519-528.

Temlyakov, et al., "Two Perceptually Motivated Strategies for Shape Classification", retrieved on Feb. 9, 2013 at <<http://ieeexplore.ieee.org/stamp/stamp.jsp?tp=&arnumber=5539912>>, IEEE Conference on Computer Vision and Pattern Recognition (CVPR), Jun. 18, 2010, pp. 2289-2296.

Wang, et al., "Sketch2Cartoon: Composing Cartoon Images by Sketching", retrieved on Feb. 9, 2013 at <<http://research.microsoft.com/pubs/151260/td36c-wangPS.pdf>>, Proceedings of ACM Intl Conference on Multimedia (MM), Nov. 28, 2011, pp. 789-790.

Wertheimer, "Laws of Organization in Perceptual Forms", retrieved on Mar. 4, 2013 at <<http://psychclassics.yorku.ca/Wertheimer/Forms/forms.htm>>, Psycologische Forschung (Gestalt Psychology), vol. 4, 1923, pp. 301-350. (English translation: A source book of Gestalt psychology, 1938, pp. 71-88).

Yang, "Sketch-based Modeling of Parameterized Objects", retrieved on Feb. 9, 2013 at <<http://www.cs.ubc.ca/labs/imager/th/2006/ChenMscThesis/Chen.pdf>>, Thesis for Master of Science, University of British Columbia, Apr. 2006, 70 pages.

Yu et al., "A Domain-Independent System for Sketch Recognition", The Association for Computing Machinery, Inc., State Key Laboratory of Software Novel Technology, Nanjing University, China, 2003, pp. 141-146.

Zhang et al., "A Comparative Study of Fourier Descriptors for Shape Representation and Retrieval", In The 5th Asian Conference on Computer Vision, Jan. 23-25, 2002, 6 pages.

* cited by examiner

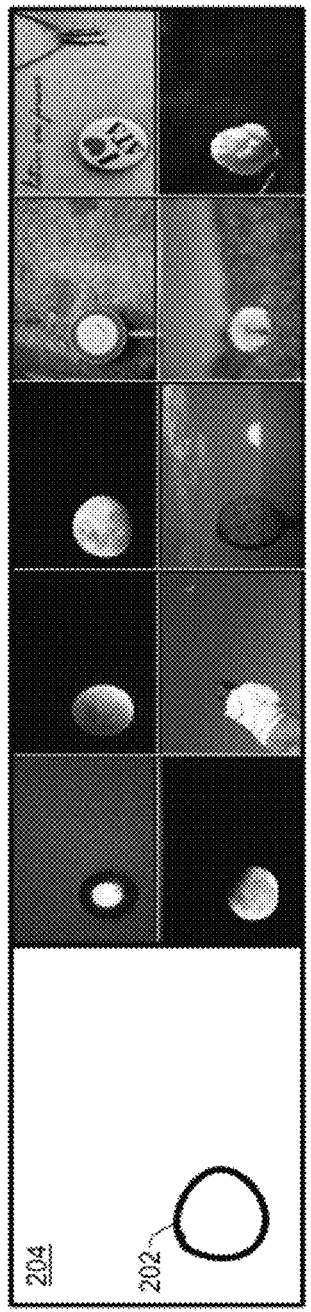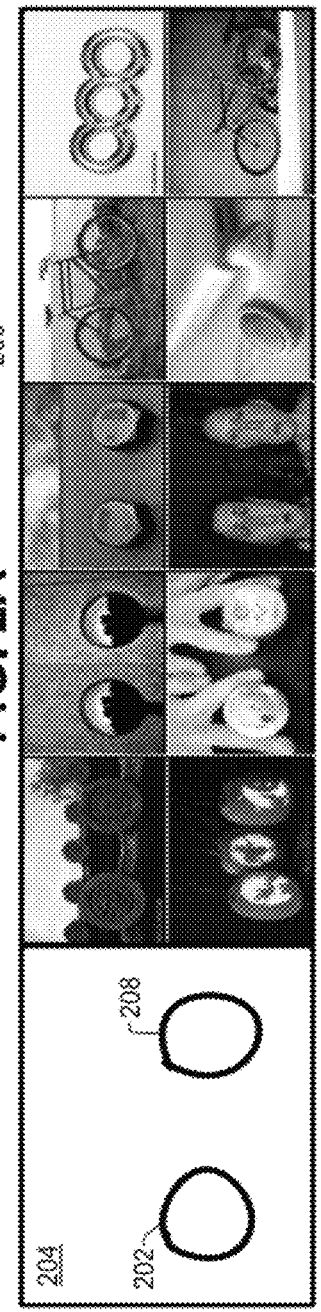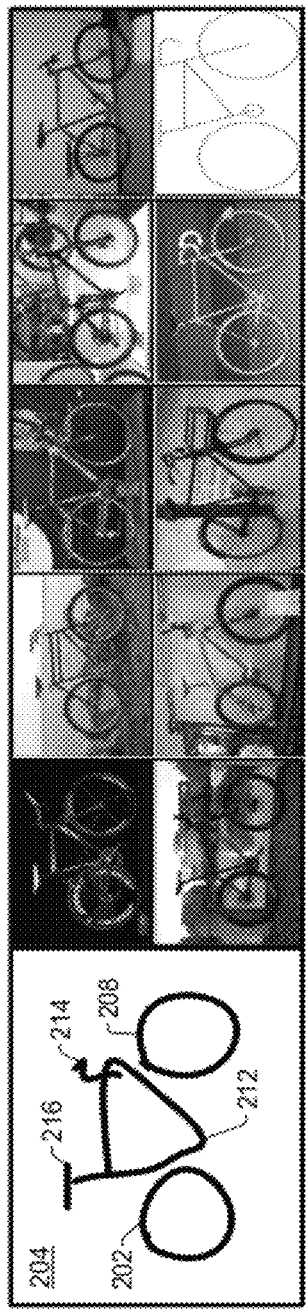

SKETCH-BASED IMAGE SEARCH

BACKGROUND

With the increased prevalence of electronic imaging devices and the Internet, billions of digital images have become publically available and searchable online. Indexing such a huge amount of data to enable users to quickly find desired images is a massive and difficult task. For example, many images are posted without an accurate description or tagging, making it difficult to index such images using typical keyword techniques. Consequently, when a user desires to locate a complex image having particular features, conventional text-based search engines that rely on short text queries are often unable to locate desired images in a timely and efficient manner.

Additionally, while sketch-based searching of image databases has been intensively studied, little progress has been made in developing practical large-scale sketch-based search techniques. Attempts at constructing large-scale sketch-based search system have been unsuccessful for various reasons. For example, some proposed techniques lack effective edge representation and have been unable to quickly and accurately compare an input sketch with indexed images. Other proposed techniques have been unable to achieve a scalable index solution, resulting in indexes of unmanageable size or complexity when applied to many millions of images.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide techniques for using a query curve as a search query to conduct a sketch-based image search to accurately locate and retrieve images. Further, some implementations provide indexing techniques to efficiently index huge quantities of natural images to facilitate a sketch-based search.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIGS. 2A-2C illustrate an example of a real-time interactive sketch-based search according to some implementations.

DETAILED DESCRIPTION

Sketch-Based Searching

Figure 1:
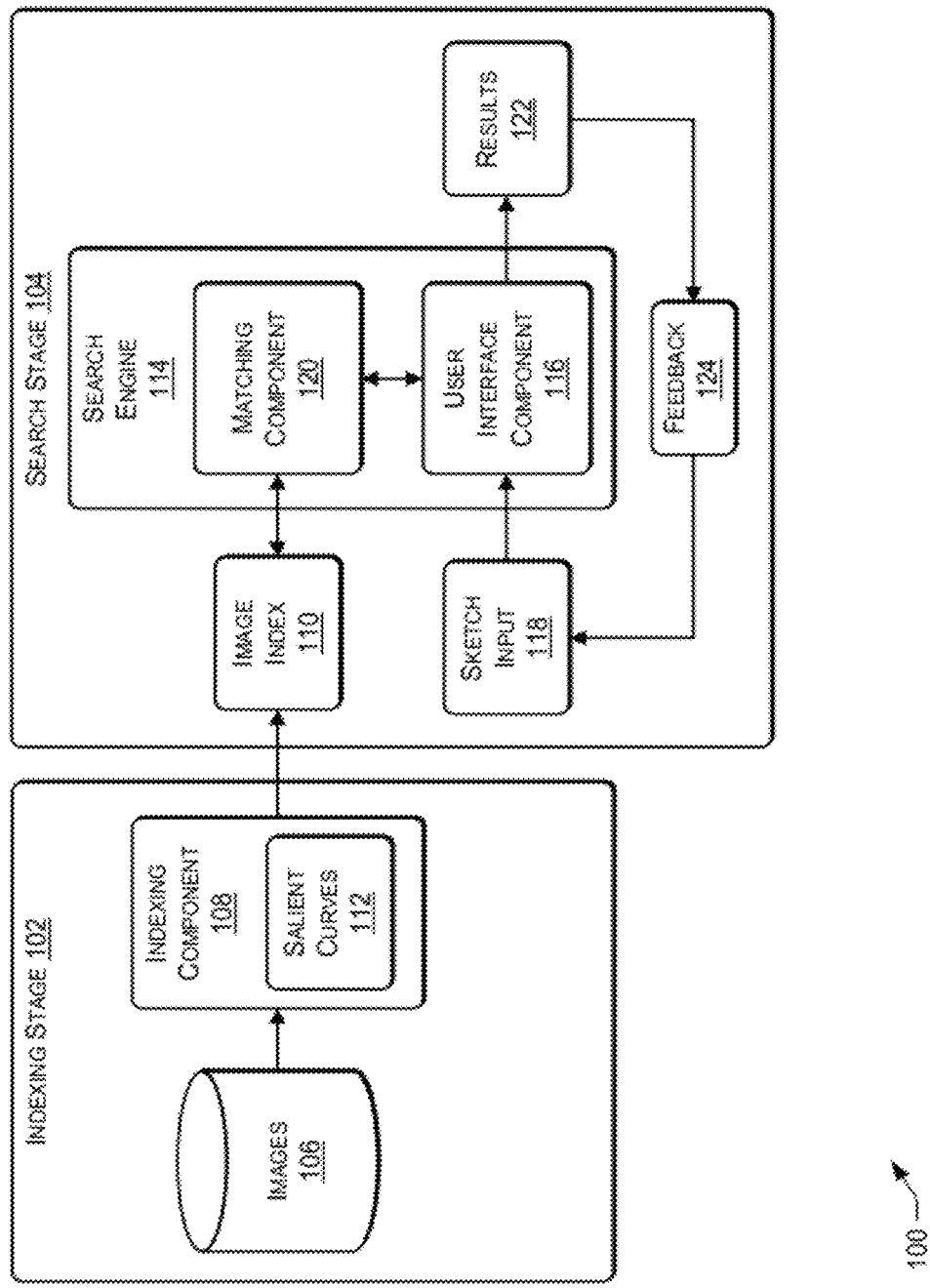
FIG. 1 is a block diagram of a framework for sketch-based searching according to some implementations.

The technologies described herein are generally directed towards techniques for sketch-based searching of images. Some implementations employ a salient curve discovery scheme for detecting major or salient curves in natural images to enable effective indexing and representation of the images. Further, some implementations apply a raw curve-based process to calculate a similarity between a query sketch input and curve maps generated for natural images. Further, a user interface may be provided to enable users to flexibly formulate queries using any combination of sketch inputs, text inputs and color selection inputs.

To index millions of images and to enable responding to sketch-based queries in real time, some implementations utilize a locality-sensitive curve-indexing framework that is designed to take into account storage cost, image retrieval accuracy, and computing efficiency. The indexing techniques disclosed herein may be used to create a manageable and searchable index encompassing millions of images. In some implantations, the resolution of the images may be reduced to an optimal resolution during identification of salient curves in the images to provide a balance between error rate and memory space. Consequently, implementations herein are able to provide a large-scale indexing framework for query-by-sketch image search and a search engine that enables matching of sketch queries with images.

Some implementations herein provide techniques for sketch-based searching that is substantially faster and more accurate than conventional techniques. In real-world cases, the user's search intention is often complex and can change during the search. Accordingly, some implementations provide an interactive user interface to help users express their intentions and find desired images in a step-by-step manner by refining their sketch queries. The user interface may include a query panel or window which enables users to compose a complex query, such as by drawing a sketch, entering one or more keywords, and specifying a dominant color. Furthermore, the prevalence of devices with touch screen capability has made the human-computer interaction, and sketching in particular, much easier than before.

Additionally, the availability of tags and text with many web images can also be leveraged to improve the accuracy of a sketch-based image search. In some implementations, a text query can be used in conjunction with a sketch query to bridge the semantic gap between the sketch query and a natural image when the sketch itself is insufficient to describe a user's query intention. For example, if a user draws a circle as his/her query to find the Moon, the system may return images containing many circular objects, but not necessarily the Moon. In this case, a text query submitted in conjunction with the sketch query can assist in improving the relevance of the search results. Additionally, some implementations herein enable a color to be specified in conjunction with the sketch query. For example, if a user desires to locate an image of a flower of a particular color, the user can specify the particular color as a color-based query submitted in conjunction with the sketch-based query and/or the text-based query.

Some implementations herein extract a representative contour for a natural image, which may be used to match the image with a query sketch. Accordingly, implementations are able to efficiently and accurately match a query sketch with a contour in a natural image. Users submitting a sketch query rather than merely a text query have indicated that the shape or contour structure of resulting images is a priority. Thus, users expect the resulting images to closely match their sketch input. Most conventional query-by-sketch techniques have scalability issues because they do not have index mechanisms to speed up the sketch-to-image matching. Implementations herein include a salient curve identification approach to detect one or more salient curves to represent an image. The salient curves of an image have the potential to more closely match a users' sketch input Implementations herein also provide a raw-curve-based algorithm to calculate the similarity between a query sketch and a natural image. This matching algorithm may be adapted for the indexing strategy disclosed herein and optimized for improving the user experience. To be scalable to millions of images, a locality-sensitive curve indexing strategy may be used that considers index size, retrieval precision, and retrieval efficiency. Under this indexing scheme, an image is represented by a set of visual-words. Each visual word may represent a pixel, and may be expressed as a direction-oriented point $\{x, y, \theta\}$, which indicates that a curve passes position $\{x, y\}$ of an image from a direction $\theta$. Thus, the $\theta$ provides an orientation to the position $\{x, y\}$ which reduces the number of possible matches while increasing accuracy.

Implementations use the indexing and matching framework disclosed herein to provide a real-time sketch-based image search system. Further, in order to improve the retrieval precision and the user search experience, implementations provide an interactive user-friendly interface, which enables users to flexibly formulate and refine their queries interactively. In addition to searching based on sketch inputs, some implementations include searching based on color or text inputs, which perform in a complementary manner, such as in the case in which some visual elements or semantic meanings cannot be conveniently presented by a sketch.

Example Framework for Sketch-Based Search

FIG. 1 is a block diagram of an example of an interactive sketch-based image search framework 100 according to some implementations herein. The framework 100 is capable of performing as a real-time sketch-based interactive image search system for indexing and searching millions of images. The framework 100 may enable precise matching between an input sketch query and one or more images in an image source, such as a database, the Internet, or the like. The framework 100 includes an offline or indexing stage 102 and an online or search stage 104. The indexing stage 102 includes one or more databases or sources of images 106. For example, images 106 may be obtained from any suitable source, such as by crawling Internet websites, by downloading or uploading image databases, by storing images from imaging devices to computer storage media, and so forth. In some implementations, images 106 may be millions or even billions of natural images, photographs, or the like available on the World Wide Web. The indexing stage 102 also includes an indexing component 108 for generating an image index 110 of the images 106. Image index 110 may be a sketch matching image index for identifying one or more images based on a query curve input. In some implementations, the indexing component 108 identifies one or more major or salient curves 112 in each of the images 106 and generates the image index 110 based on these salient curves 112. For example, each salient curve 112 may be expressed as a collection or set of oriented points, and an inverted index structure may be created based on the distinct oriented points. The oriented points serve as index entries or visual words that make up the index, and image identifiers are associated with particular visual words based on whether they have salient curves containing the particular visual words.

The image index 110 generated during the indexing stage 102 may be made available for use by a search engine 114 during the search stage 104. The search engine 114 may provide a user interface component 116 able to receive a sketch input 118 submitted as a query. In the illustrated implementation, user interface component 116 is provided with search engine 114. For example, the user interface may be presented as a webpage to a user in a web browser window. In other implementations, the user interface component 116 may be incorporated into a web browser or other application on a user's computer, may be an add-in or upgrade to a web browser, etc. Search engine 114 also includes a matching component 120 configured to receive the sketch input 118 and carry out a matching and ranking function for locating one or more images 106 that correspond to the sketch input 118. In some implementations, the matching component 120 uses at least a one-way database-to-query matching scheme based on one or more curves identified in the sketch input 118. Further, in other implementations, the matching component 120 may use a two-way indexing-and-matching scheme or an approximate two-way indexing-and-matching scheme that includes both database-to-query matching and query-to-database matching. The matching component 120 identifies one or more images corresponding to the sketch input 118, and the user interface component 116 outputs one or more of the identified images as results 122. The results 122 may be displayed or otherwise provided as feedback 124 in real-time to the user. If the user is not satisfied with the results 122, the user may interactively modify the sketch input 118 such as by adding additional curves to the sketch, deleting or erasing curves or portions of curves, or the like.

FIGS. 2A-2C illustrate an example of the real-time interactive searching that may be executed using the framework 100 according to some implementations herein. As illustrated in FIG. 2A, a user may draw a first sketch 202 in a user interface 204 as a sketch input 118 submitted to the framework 100. The first sketch 202 is submitted and the framework 100 may display a plurality of images 206 as feedback of the results of the search. As illustrated in FIG. 2B, if the images 206 returned in response to the first sketch 202 do not satisfy the user's search intention, the user may interactively add one or more additional lines or curves and/or delete some or all of the existing lines or curves. In the illustrated example, the user adds a second sketch 208 in the user interface 204, and the framework 100, in response, returns a second plurality of images 210 based upon the first sketch 202 and the second sketch 208 as the sketch input query. If the second plurality of images 210 still does not satisfy the user's search intention, the user may add or delete additional sketch lines to further refine the sketch input. As illustrated in FIG. 2C, in this example, the user adds additional sketch curves 212, 214, 216, and the framework 100 returns a third plurality of images 218 based upon sketch curves 202, 208, 212, 214, and 216 as the sketch input submitted as the query. Thus, from the foregoing example, it may be seen that the user can interactively refine the sketch input in real-time using the user interface to locate one or more images that match a search intention.

Figure 3:
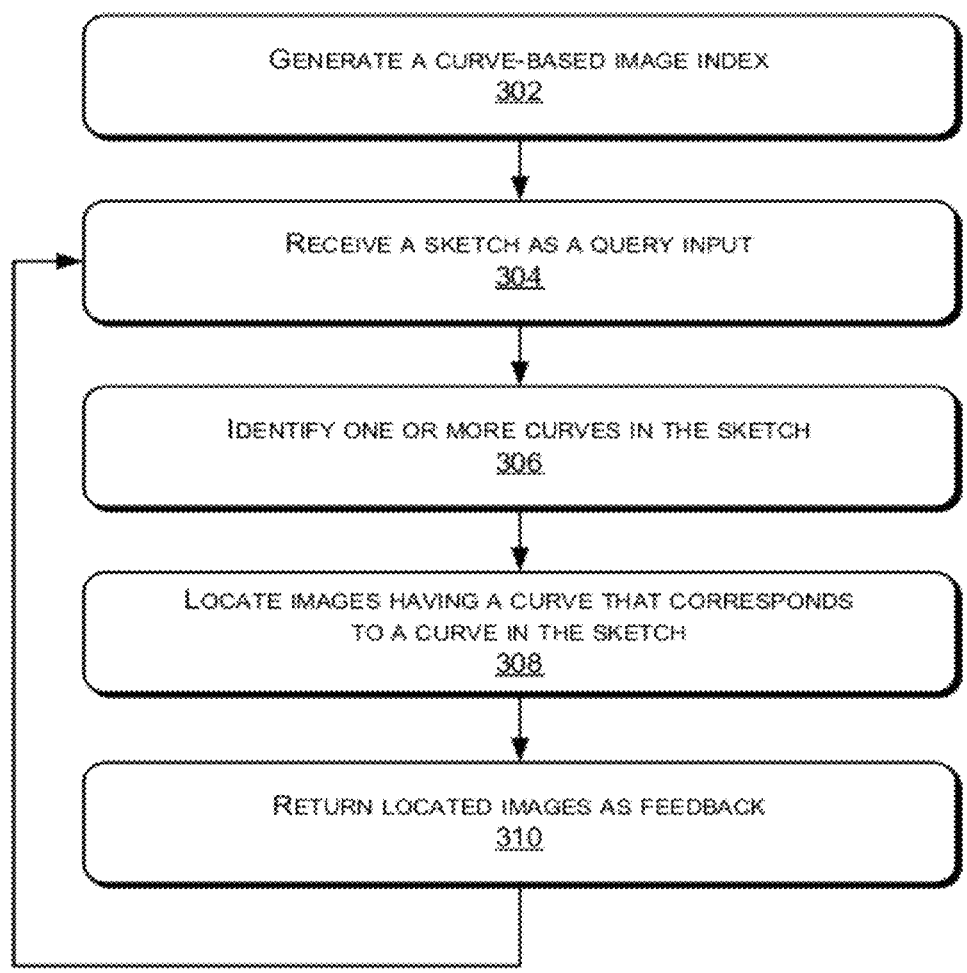
FIG. 3 is a flow diagram of an example process for sketch-based searching according to some implementations.

FIG. 3 is a flow diagram of an example process 300 for executing a sketch-based search according to some implementations herein. In the flow diagram, the operations are summarized in individual blocks. The operations may be performed in hardware, or as processor-executable instructions (software or firmware) that may be executed by one or more processors. Further, the process 300 may, but need not necessarily, be implemented using the framework 100 of FIG. 1.

At block 302, the framework 100 generates a curve-based image index for a plurality of images. For example, the framework 100 may detect one or more major or salient curves in each of the images and generate an index based on the location and orientation of points contained in each of the detected salient curves.

At block 304, the framework 100 receives a sketch as a sketch query input. For example, a user may submit a sketch as a sketch query input to a user interface provided by the framework or provided by a web browser or other application.

At block 306, the framework identifies one or more curves in the sketch submitted as the sketch query input.

At block 308, the framework locates one or more images having curves that correspond to the one more sketch curves. For example, the framework may use the image index to identify one or more images having salient curves with oriented points that are similar to the oriented points of the sketch curves submitted in the sketch query input. The framework may further employ various ranking schemes, as discussed further below for ranking the identified images.

At block 310, the located images are returned and displayed to the user as feedback. If the user is not be satisfied with the results of the search, the user can further refine the sketch interactively in real-time and the process returns to block 304 to process the refined sketch as the query input. The user may continue to interactively refine the sketch until the desired results are achieved.

Matching Techniques

By employing implementations of the sketch-based image search techniques disclosed herein, a user can simply sketch one or more strokes in a user interface to represent the contours of an object or a scene, and the framework returns one or more "matching" images to the user. The "matching" images are identified based upon at least two conditions of similarity to the sketch input, namely, similar shape and similar position. Accordingly, it is desirable that the shape of the object or scene in the resulting image resembles the shape of the user's sketch input. Furthermore, it is desirable that the position of the matched object or scene in the resulting image is located at a similar position as in the input sketch.

The sketches herein may be represented by one or more curves, and each curve may be broken down into a plurality of adjacently positioned pixels. Similarly, the salient curves identified for the images in the database may also be represented by a plurality of adjacently positioned pixels. To achieve similarity matching, many similarity measures may be adopted for use by implementations herein. Some implementations herein utilize variations of a Chamfer Matching technique which is described, for example, by J. Shotton, A. Blake, and R. Cipolla in "Multiscale categorical object recognition using contour fragments," PAMI, 2008, although other implementations herein may use alternative matching techniques.

According to the Chamfer Matching technique, a set of points $\mathcal{D}$ may be used to represent the curves of an image, where the position of a point $p \in \mathcal{D}$ is denoted by $x_p=(x_p, y_p)$. The basic Chamfer Distance from query sketch Q to a database image D is given as follows:

$$Dist_{Q \to \mathcal{D}} = \frac{1}{|Q|} \sum_{q \in Q} \min_{p \in \mathcal{D}} \|x_q - x_p\|_2 \qquad (1)$$

where $|Q|$ is the number of pixels of the query sketch curves. Chamfer Matching may be used to find the nearest pixel on a database image $\mathcal{D}$ for every pixel of the query sketch. In order to reduce the complexity from $O(|Q| \times |\mathcal{D}|)$ to $O(|Q|)$, a distance map of the database image $\mathcal{D}$ may be constructed in advance during the offline or indexing stage and stored by the framework so as to substitute storage cost for online search processing time.

Figure 4:
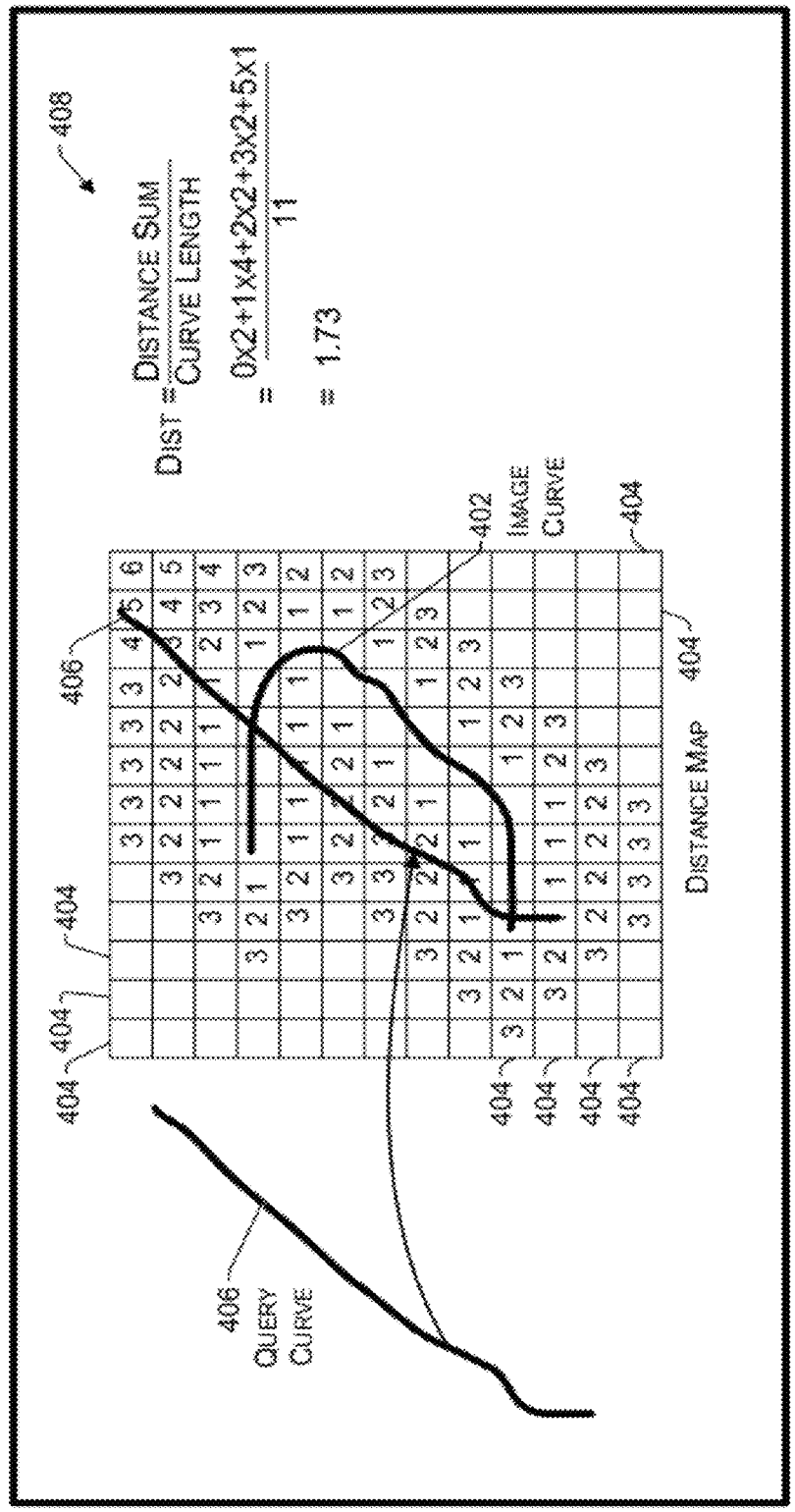
FIG. 4 depicts an example of a distance map according to some implementations.

FIG. 4 illustrates an example of a curve or distance map 400 for a database image having an image curve 402. The distance map 400 is illustrated as a plurality of squares 404, in which each square 404 represents a pixel. The pixels that make up the image curve 402 are given a value of zero, and each pixel that is located some distance from the curve is given a value corresponding to the pixel distance. For example, a pixel that is one pixel away from the curve is given a value of "1", a pixel that is two pixels away from the curve is given a value of "2", and so forth. A sketch query curve 406 may be overlaid on the distance map for determining a similarity to the image curve 402. Thus, as shown by calculation 408, the distance equals the sum of the pixel distances divided by the curve length in pixels. For the illustrated example, the query curve 406 overlies two pixels having a value of "0", four pixels having a value of "1", two pixels having a value of "2", two pixels having a value of "3" and one pixel having a value of "5". These pixel values are added together and divided by the length of the query curve 406 ("11") to arrive at the distance between the query curve 406 and the image curve 402, which in the illustrated example is equal to 1.73. The lower the distance value, the closer the match between the query curve 406 and the image curve 402.

In addition, matching accuracy may be improved by determining a symmetric Chamfer distance that considers both the distance from the query curve to the image curve and the distance from the image curve to the query curve. The symmetric Chamfer Distance is given by:

$$Dist_{Q,D} = \frac{1}{2}(Dist_{Q \to D} + Dist_{D \to Q}) \qquad (2)$$

To encode oriented information of a curve during the matching, basic Oriented Chamfer Matching has been proposed as follows:

$$Dist_{Q \to D} = \frac{1}{|Q|} \sum_{\theta \in \Theta} \sum_{\substack{q \in Q \& \theta_q = \theta}} \min_{p \in D \& \theta_p = \theta} \|x_q - x_p\|_2 \qquad (3)$$

where $\Theta$ is the set of quantified orientations.

However, a shortcoming of basic Oriented Chamfer Matching is a lack of scalability. For example, to use Oriented Chamfer Matching, it may be necessary to compare a query sketch with all the images in a database and store the corresponding distance maps for speeding up processing. To illustrate this cost, suppose that there is a database with two million images having a typical resolution of 500×375 pixels. Further, suppose that at least every 30 pixels produce an edge point from statistical data using the boundary detector, which means that a typical edge map has 6250 points. Thus, the storage used for two million images may approach 58 GB, which is difficult to fit into a memory of a conventional computing device. Moreover, in some implementations of Oriented Chamfer Matching, the memory used may be at least 931 GB to store all the pre-computed distance maps, which most common server computing devices with 8 GB~32 GB memory would be unable to handle. Furthermore, even if the memory usage was manageable, the search time for searching such a large amount of data would be far from acceptable for a real-time interactive search engine.

To avoid the above issues, some implementations herein provide for efficient contour representation of images to reduce the size of image features, thereby reducing the memory storage used. For example, a salient curve discovery scheme is disclosed herein and may be used to extract the primary or salient curves from images, which greatly reduces the memory cost. Further some implementations also utilize an effective matching scheme to reduce the computational search cost. For example a raw curve-based matching process is disclosed herein which provides a precise and efficient matching between a salient curve map and a user's sketch query. Some implementations may also be adapted for a locality-sensitive curve indexing structure to speed up the retrieval process. Moreover, as discussed above, some implementations also take into account the index solution when designing the image representation and matching scheme so as to ensure that the entire framework is scalable. Consequently, some implementations herein have been able to achieve indexing of two million images to support a sketch-based search system using less than 8 GB of memory and having a real-time response of less than 2 seconds.

Example Indexing and Search Framework

Figure 5:
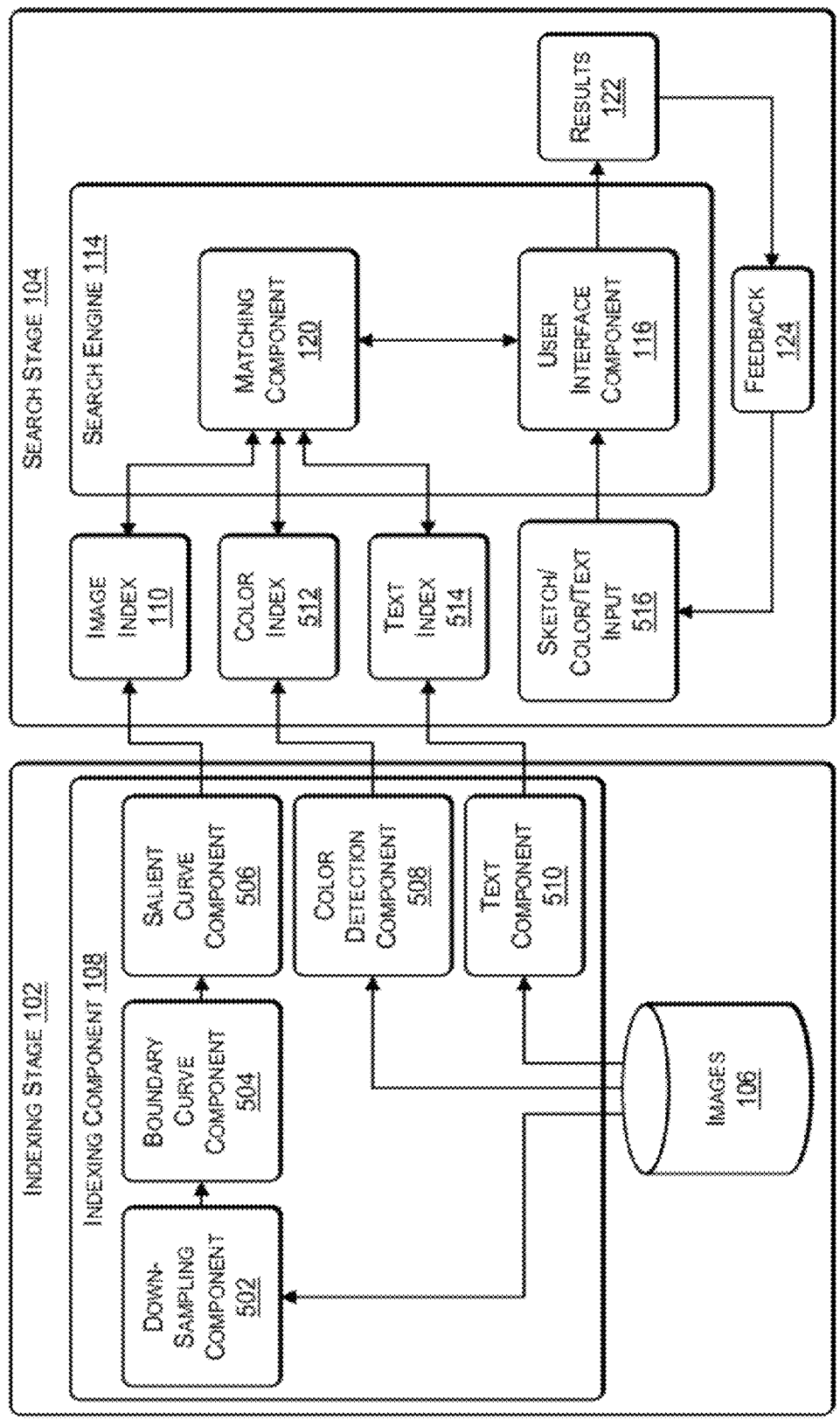
FIG. 5 is a block diagram of a framework for sketch-based searching according to some implementations.

FIG. 5 is a block diagram illustrating an example framework 500 according to some implementations. Framework 500 builds on the framework 100 described above, and includes the indexing stage 102 and the search stage 104. In these implementations, indexing component 108 may include a down-sampling component 502, a boundary curve component 504, a salient curve component 506, a color detection component 508, and a text component 510. As will be described additionally below, the down-sampling component 502 is configured to reduce the size of the images 106 to reduce the storage used for the salient curves and other data used for indexing and matching. The boundary curve component 504 is configured to recognize boundary curves as part of the technique herein for determining salient curves of the images 106. The salient curve component 506 is configured to recognize salient curves for the images 106, i.e., those curves considered to most likely represent the image contents. The color detection component 508 is configured to create a color index 512 identifying one or more dominant colors associated with each image 106. Further, the text component 510 is configured to create a text index 514 by identifying any tags or text associated with the images 106.

In the search stage 104, the search engine 114 in these implementations matching component 120 is further configured to access color index 512 and/or text index 514 when color or text query information is provided to further identify relevant images for presentation as results 122 and feedback 124. For example, rather than merely providing a sketch as an input, some implementations also provide for submission of a text-based query and/or a color-based query in addition to enabling submission of a sketch-based query. Thus, a sketch/color/text input down-sampling component may be submitted to the user interface component 116, and any of these parameters (i.e., the sketch, the color, or the text) may be interactively adjusted or refined by a user in real time to obtain satisfactory search results.

Image Representation

Users are apt to draw major curves as sketch queries and typically expect the resulting images to contain similar major curves. The inventors herein have determined that identifying and preserving the major curves of a natural image and removing the inconspicuous or unimportant curves not only reduces the memory cost for indexing the images, but also improves matching precision. Consequently, some implementations herein provide techniques for identifying the major or salient curves in natural images to enable the salient curves to be used in indexing and query matching of the images. The salient curve identification techniques disclosed herein may include the following three features: 1) image down sampling without significant salient curve loss, 2) boundary curve extraction, and 3) salient curve extraction. The final salient curve representation not only reduces memory cost, but also tends to closely correspond to the human cognitive mechanism for visualizing an object or scene.

Low Resolution Image Representation

The inventors herein have determined that it is not necessary to employ full resolution or high definition images for identifying the salient curves in a natural image. Accordingly, the resolution of an image may be down-sampled or otherwise reduced without affecting the salient curve identification techniques herein. This can reduce the total memory usage for implementations herein, so as to better manage the huge amount of data being indexed and searched.

Figure 6:
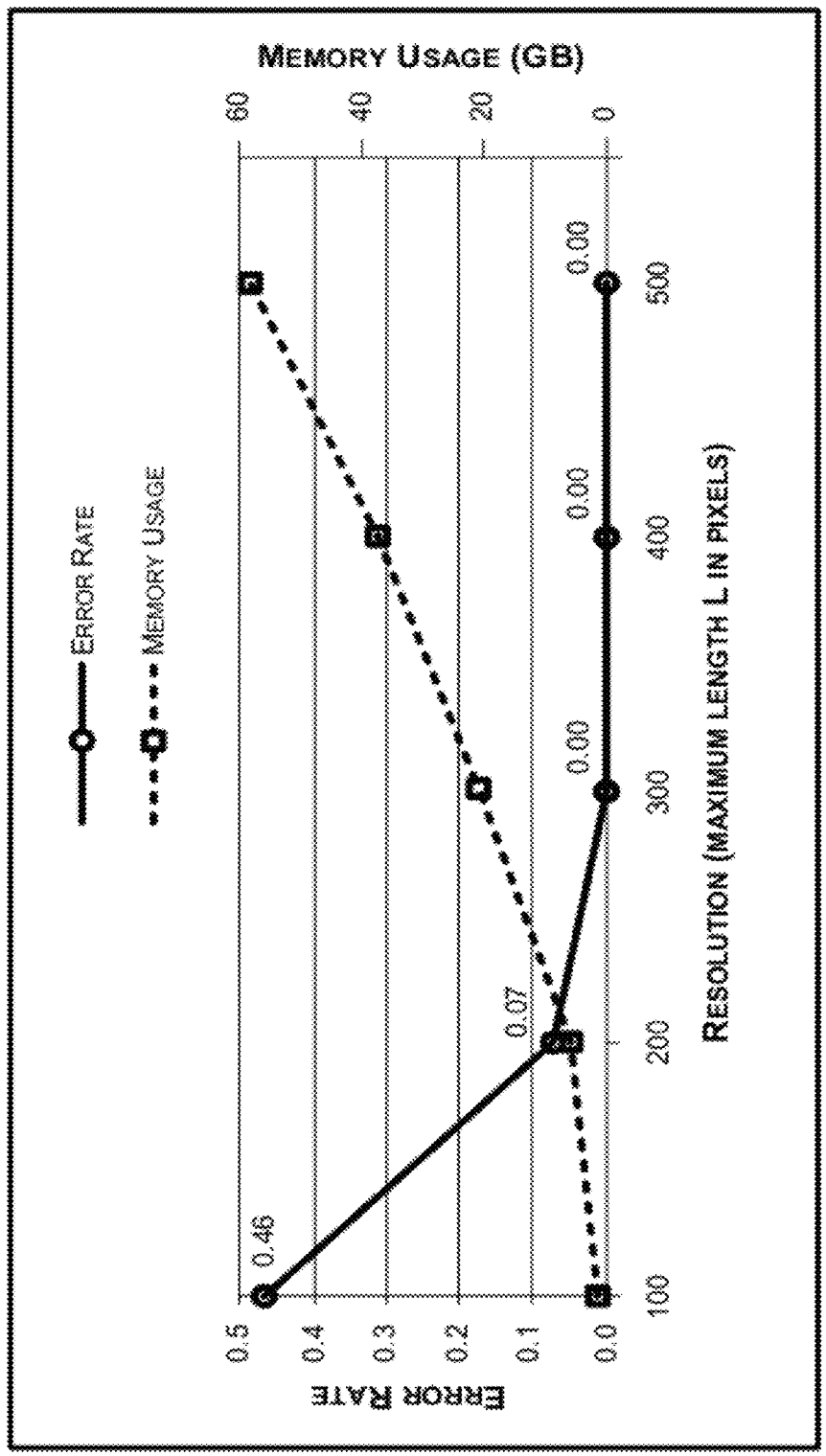
FIG. 6 is a graph illustrating error rate and estimated memory usage vs. image resolution.

FIG. 6 is graph 600 illustrating the results of a study by the inventors herein for determining an optimal level to which an image's resolution may be downgraded without significant salient curve loss. "Resolution" represents the maximum length (L) of the image in pixels (i.e., the image is down sampled until both the height and width of the image are less than L, while maintaining the original height-to-width aspect). "Error Rate" indicates the percentage for which structures of the salient curves were unrecognizable for each resolution. "Memory" represents the estimated corresponding memory usage at each resolution for enabling searching of two million images. Graph 600 shows that for a resolution of L=100, the error rate is 46 percent, while for a resolution of L=200, the error rate drops to only 7 percent, and for resolutions of L=300 and above, the error rate is essentially zero. Thus, graph 600 illustrates that down sampling an image from, e.g., L=500 to L=200 provides a good balance between salient curve loss and memory cost. Further, when the maximum resolution is less than L=256, according to some implementations, each salient curve coordinate may be stored using only one byte, rather than two bytes, which helps to significantly reduce the memory cost. Consequently, an optimal resolution according to some implementations may be between L=200 and L=256. For example, by employing a resolution of L=200, some implementations herein reduce memory usage to 8 GB or less of memory for enabling searching of 2 million images, which is tolerable for conventional computing devices.

As discussed above with reference to FIG. 5, the down-sampling component 502 may be used to down sample each image 106 during the indexing stage 102 using any suitable resolution reduction techniques. Thus, in preparation for the salient curve identification process, the down-sampling component 502 may be configured to reduce the resolution of each image to a predetermined optimal resolution. In some implementations, images having a resolution larger than L=256 pixels may have their resolutions reduced to a maximum length L of less than or equal to 256 pixels. Of course, for images already having a resolution less than the predetermined maximum length L, down sampling is not necessary. Following down sampling, the lower-resolution images may then be provided to the boundary curve component 504 for detection of object boundaries, as discussed next.

Boundary Curve Representation

Some implementations herein employ a natural boundary detector as part of boundary curve component 504 to extract edges or boundaries of objects from an image for use in identifying the salient curves of the image. Typically, a boundary detector uses brightness, color and texture information to accurately detect and localize object curves and edges to distinguish the boundaries of objects in an image. An example of a suitable boundary detector is described by D. R. Martin, C. C. Fowlkes and J. Malik in "Learning to detect natural image boundaries using local brightness, color, and texture cues," PAMI, 2004, although implementations herein are not limited to any particular method for detecting object boundaries in images.

Figure 7C:
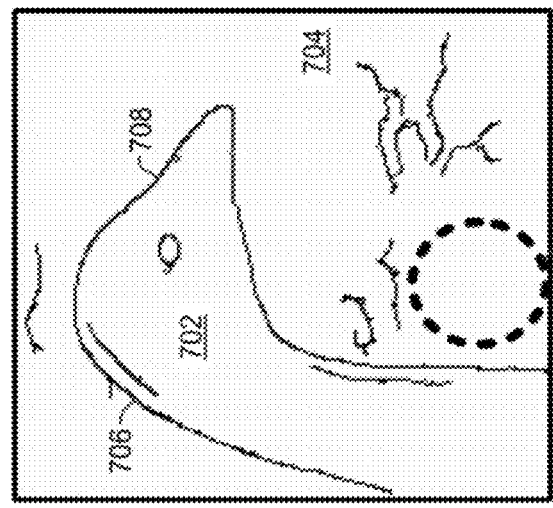
FIGS. 7A-7C illustrate an example of boundary detection and salient curve identification according to some implementations.
Figure 7B:
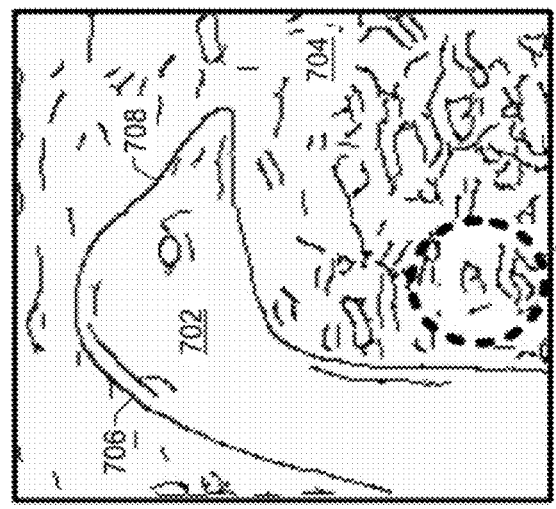
Figure 7A:
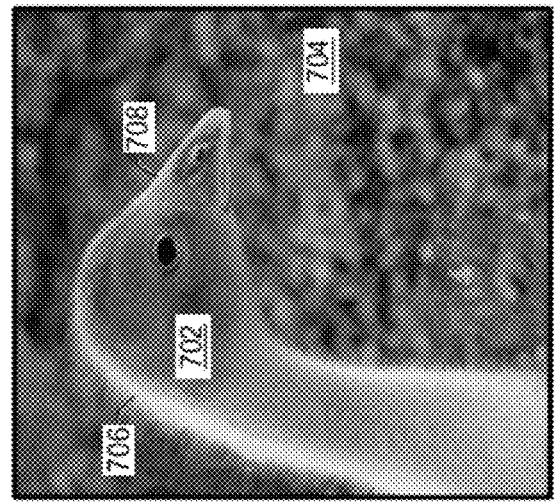

FIGS. 7A-7C illustrate an example of boundary curve detection and salient curve identification according to some implementations. FIG. 7A depicts an image 700 having a goose 702 as a recognizable object. The goose 702 is recognizable from a background 704 of the image 700 due to differences in color, brightness and texture, such as are indicated at locations 706 and 708.

FIG. 7B depicts a boundary curve representation 710 of the image 700, as may be generated using boundary curve component 504 using a boundary detector, such as that mentioned above. Thus, the boundary curve component 504 receives an image and detects the raw boundary curves in the image based on the differences in color, brightness and texture. To express the shape information of each boundary, implementations herein also may contain local orientation information of a boundary curve, denoted as $\theta \in \Theta$, where $\Theta$ is the set of quantified orientations (in some examples herein, there are six possible orientations for a curve, i.e., 30 degrees per bin). In the illustrated example, the boundary curve representation 710 includes a plurality of curves representing the background 704 and still maintains a recognizable representation of the goose 702, including locations 706 and 708.

Salient Curve Representation

Because users typically envision the major or salient outlines of objects for which they are searching, some implementations herein further refine the processed boundary curve representation 710 by identifying salient curves contained within the boundary curve representations of each image. Thus, the salient curve component 506 may receive the boundary curve representation 710 for each image from the boundary curve component 504. The salient curve component 506 then identifies the salient curves contained in the image. Thus, some implementations herein assume that the salient curves for each image are contained in the identified raw boundary curves.

Various different techniques may be used to identify the salient curves in an image. Some implementations herein adopt a modified Connected Graph Algorithm to extract continuous curves from the identified raw boundaries as the salient curves. A difference between these implementations and the classic Connected Graph Algorithm is that, when determining whether two points are connected, the salient curve component determines not only that the two points are adjacent, but also determines that the two points have a similar local orientation (i.e., in which the orientations of the two points are the same or adjacent). The sets of connected vertices or points determined by this algorithm are so-called continuous curves. Among boundaries, long and continuous curves typically belong to more salient objects. Accordingly, some implementations herein filter out short curves having a length less than a predetermined threshold. For example, the threshold may be set to eliminate curves that have a length "Ls" that is less than a predetermined threshold (e.g., 40 pixels in some implementation, although other suitable thresholds may also be used).

FIG. 7C depicts a salient curve representation 712 of the salient curves identified from the image 700. In FIG. 7C, short boundary curves (i.e., those less than the predetermined threshold) have been completely filtered out, such as is shown in the area encompassed by dashed circle 714. As is evident from the salient curve representation 712, the major curves of the goose 702 are still represented, such as at locations 706, 708, while the boundary curves in the background have been mostly removed. This salient curve representation technique serves two purposes. First, it tends to represent the typical cognitive mechanism of a person when visualizing an object or scene. Second, it further reduces the number of points for indexing. For instance, in the example of two million images mentioned above, the number of points for indexing is reduced from 2819 million to 1001 million, and the corresponding memory cost is reduced accordingly. Further, all of the above operations may be processed offline in preparation for generating an index for the images 106, which results in a highly responsive search system, as the online calculation carried out in response to a search query are minimized.

Sketch Matching

With the proposed salient curve extraction scheme described above, each image 106 may be converted into a set of oriented points $\mathcal{D}$, in which the set of points represent the salient curves of the image. Each pixel or point $p \in \mathcal{D}$ is represented by $\{x_p, \theta_p\}$, where $x_p = (x_p, y_p)$ is the coordinate of the point, and $\theta_p$ is the quantified tangential direction of the corresponding curve at $x_p$. A sketch received as a sketch query input may be analyzed in real time and represented by a similar set of oriented points $Q$ in which each point $q \in Q$ is represented by $\{x_q, \theta_q\}$, where $x_q = (x_q, y_q)$.

Locally Robust Chamfer Matching

Some implementations herein employ a locally robust Chamfer matching approach for matching a sketch query input with the salient curves in a database image. These implementations are able to take into consideration both the approximate position and shape of the curves in the sketch query input, without requiring that the query sketch exactly match with the salient curves at the same position. For example, users typically may be tolerant of a little displacement from where they position their input sketch relative to the rest of the image, but they do care that the results generally match the shape of their input sketch. Thus, some implementations herein are designed to allow some local displacement by employing a tolerance radius r to provide a curve position tolerance. However, these implementations may also ensure that the matched points generally have the same orientation when carrying out curve shape matching. Accordingly, for a point $q \in Q$ a Hit function may be defined as follows:

$$Hit_{Q \to \mathcal{D}}(q) = \begin{cases} 1 & \exists p \in \mathcal{D}(\|q - p\|_1 \le r \ \& \ \theta_q = \theta_p), \\ 0 & \text{otherwise.} \end{cases} \quad (4)$$

Thus, this equation determines whether the points in the sketch query match with those in a particular salient curve within the tolerance radius r. In some implementations, the tolerance radius r may be set to a suitable tolerance value, such as between 2 and 10 pixels, although other suitable tolerance radiuses may also be used to provide a tolerance area or range of a predetermined number of oriented points around the curve.

Figure 8:
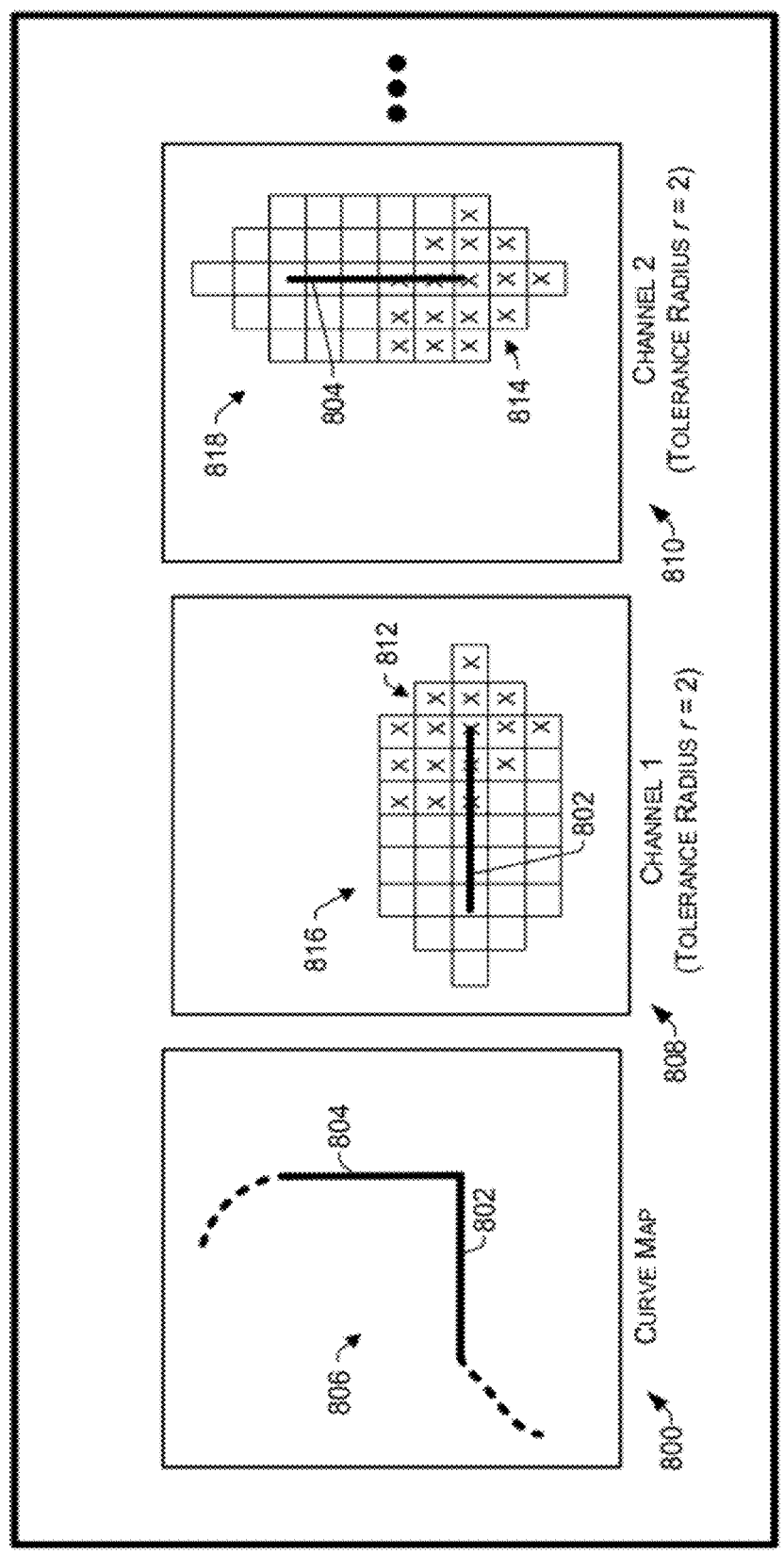
FIG. 8 illustrates examples of binary maps for curve portions having different orientations according to some implementations.

FIG. 8 depicts an example of generating a distance map for a curve with a tolerance radius of r=2 while taking orientation $\theta$ into consideration. A curve map 800 includes a horizontal line as a first curve portion 802 and a vertical line as a second curve portion 804 of a curve 806. Consequently, in the curve map 800 the first curve portion 802 and the second curve portion 804 are adjacent but they have different orientations, i.e., different directional components. Therefore, first curve portion 802 and the second curve portion 804 affect nearby points within the tolerance radius in different directions or channels. A first binary distance map 808 may be generated for the first curve portion 802 in a first channel corresponding to the orientation of the first curve portion 802. Similarly, a second distance binary map 810 may be generated for the second curve portion 804 in a second channel corresponding to the orientation of the second curve portion 804. These binary maps 808, 810 have a number of pixels or points 812, 814 marked with an "X" in the tolerance radius that overlap, i.e., have the same position $(x_q, y_q)$, but have different orientations $\theta_q$. For example, in the first binary map 808, each of the points 812 has an orientation or direction that is same as the curve portion 802 (i.e., horizontal or the radian equivalent). Further in the second binary map 810, each of the points 814 has an orientation that is the same as the curve portion 804 (i.e., vertical or the radian equivalent). Thus, while the points 812, 814 have the same position $(x_q, y_q)$, the orientation of these points is different, and during matching, these points are treated as different visual words. Therefore, points 816 in the tolerance radius represented in the first binary map 808 make up a first subset of the oriented points that express the curve 806, and points 818 represented in the second binary map 810 make up a second subset of the oriented points that express the curve 806. Further, while the distance maps of FIG. 8 are described in the context of the query curve, distance maps may be similarly generated for the curves identified in the images 106.

The use of binary maps 808, 810 enables implementations herein to take into consideration the directional orientation of the points on a curve as well as the absolute position, thereby increasing the accuracy of the matching process over just matching absolute positions. For instance, a distance map $M^{\mathcal{D}}$ may have $N_\theta$ channels, and each channel may be represented as a binary map. For a point $q \in Q$ with orientation $\theta_p$ the point q only affects nearby points in the channel $M^{\mathcal{D}}_{\theta_q}$ with $L_1$ distance less than r. Points within the tolerance radius r may be marked as "1", and points outside the tolerance radius r may be marked as "0". By a simple Breadth-First-Search algorithm, the generation of the distance map can be completed in a time complexity of $\Omega(|D|)$. Consequently, by binarizing the distance, the Chamfer distance is transformed into a kind of Chamfer similarity. Thus, based on the distance map $M^{\mathcal{D}}$, implementations herein can calculate a similarity between two curves, e.g., $\text{Sim}_{Q \to \mathcal{D}}$, in linear time as:

$$Sim_{Q \to \mathcal{D}} = \frac{1}{|Q|} \sum_{q \in Q} M^{\mathcal{D}}_{\theta_q}(x_q, y_q) \quad (5)$$

Thus, a symmetric locally robust Chamfer similarity, i.e., taking into consideration both the similarity from $Q$ to $\mathcal{D}$ and also the similiarity from $\mathcal{D}$ to $Q$, is given by:

$$Sim_{Q, \mathcal{D}} = (Sim_{Q \to \mathcal{D}} \cdot Sim_{Q \to \mathcal{D}})^{\frac{1}{2}} \quad (6)$$

Structure-Sensitive Chamfer Similarity

When searching images, users may draw multiple individual strokes as a sketch query input with the expectation of finding some images having multiple objects. Often the image database may lack exact matching results, and the sketch query may be interpreted as applying to a single object rather than multiple objects.

Figure 9:
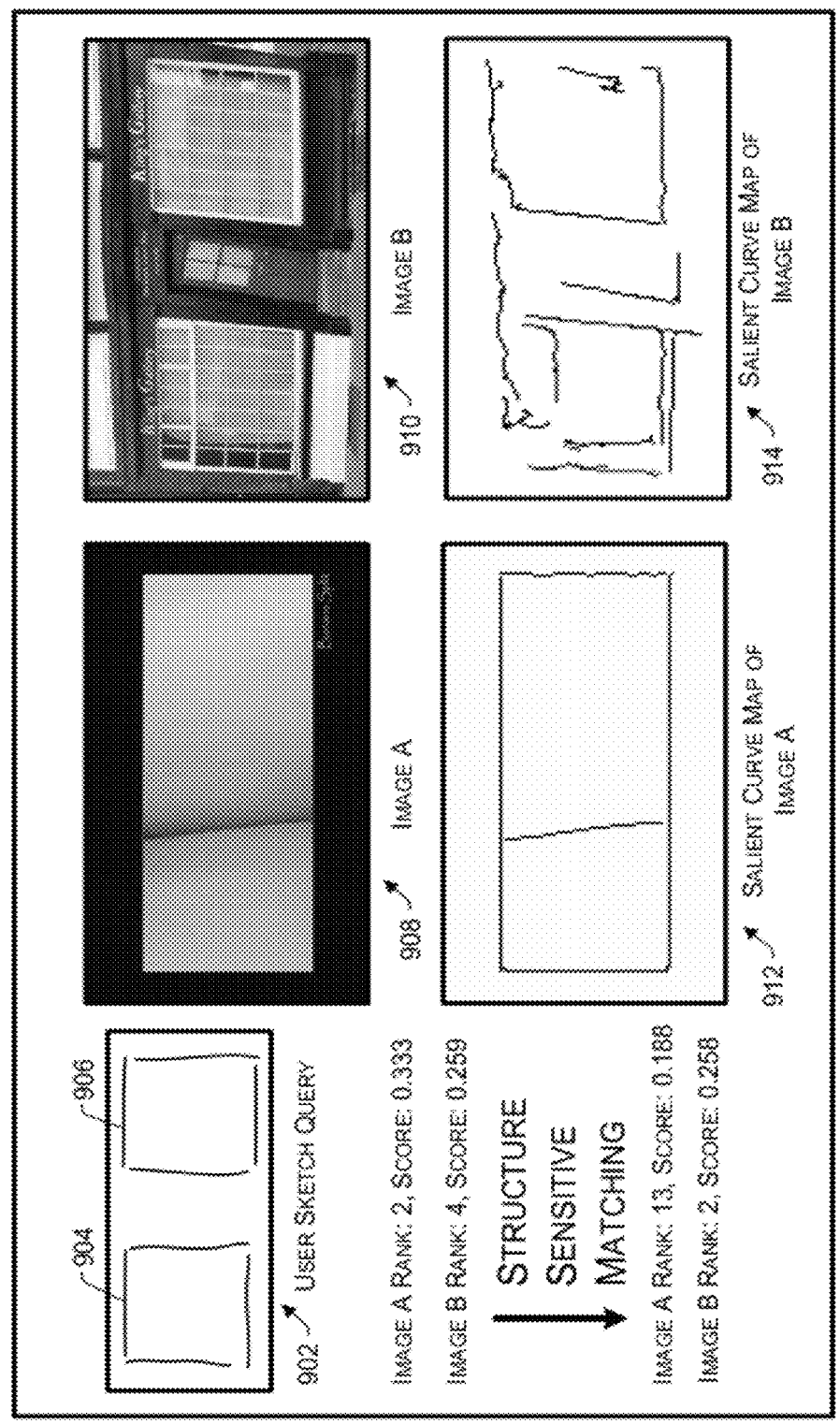
FIG. 9 illustrates the effect of structure sensitive matching according to some implementations.

FIG. 9 illustrates an example in which a user submits a sketch query 902 including sketches of two boxes 904, 906. In some implementations, the system herein may return an image A 908 and an image B 910 as part of the search results in response to the sketch query 902. A salient curve map 912 of image A shows that image A has one part that closely matches the box 904 of the sketch query 902, while a salient curve map 914 of image B shows that image B has two parts that match the sketch query 902, but with lower similarity to either box 904 and box 906. Consequently, image A 908 has the potential to be ranked higher than image B 910 in the returned results. For instance, image A 908 may be ranked second in the results with a ranking score of 0.333, while image B 910 may be ranked fourth in the results with a ranking score of 0.259. However, from a user's viewpoint, image B 910 may be more in line with the expectations of the user submitting the sketch query 902.

To address this possibility, some implementations herein evaluate the matching similarity using a global view. In these implementations, one sketch query may be treated as multiple sub-queries, and the final score may then be a combination of similarities from all the multiple sub-queries. Initially, the stroke information recorded by the user interface is able to provide a natural guide to divide the sketch query into sub-queries, as users will rarely draw a complex shape or multiple elements using a single stroke. For example, in the case of sketch query 902, each of the boxes 904, 906 are shown as being drawn using at least four separate strokes. Consequently, each stroke making up the boxes 904, 906 can be treated as a sub-query.

Additionally, in the case in which a user does employ a non-stop drawing technique, some implementations herein may divide a non-stop sketch into several continuous curves using the salient curve identification process described above. According to these implementations, each continuous curve having a length greater than a predetermined threshold $L_d$ is treated as a sub-query, and continuous curves having less than this threshold $L_d$ will be counted with the next curve until the threshold is reached. For example, in some implementations herein, the threshold $L_d$ may be one half of the canvas size of the user interface, as described below, although other suitable thresholds may also be used. For a sketch map $Q$ and its D components $\{Q_1, Q_2, \ldots, Q_D\}$, the structure-sensitive Chamfer matching similarity from $Q$ to $D$ is given by:

$$Sim_{Q \to D}^{Div} = \left( \prod_{i=1}^{D} Sim_{Q_i \to D} \right)^{\frac{1}{D}} \quad (7)$$

In the example of FIG. 9, using implementations of the structure sensitive matching similarity described above, it may be seen that the rank of image A is 13th with a ranking score of 0.188, while the rank of image B is improved to 2nd, with a ranking score of 0.258. The use of a geometric average ensures that the global matching degree becomes more dominant than local details, and the images returned as the final results are closer to user expectations.

Scalable Sketch Indexing

Some implementations herein conduct a two-way matching between a sketch query and a database image. The inventors herein have determined that carrying out a two-way matching process of matching a query to the database and also matching the database to the query can produce more accurate results than a one-way matching process. For efficient database-to-query matching, some implementations herein use the distance maps of the query curves and all boundary features of the database images. On the other hand, for query-to-database matching, some implementations herein use the raw query curves and all distance maps of the database images, while other implementations perform a more efficient approximate query-to-database matching.

Indexing for Database-to-Query Matching

Figure 10:
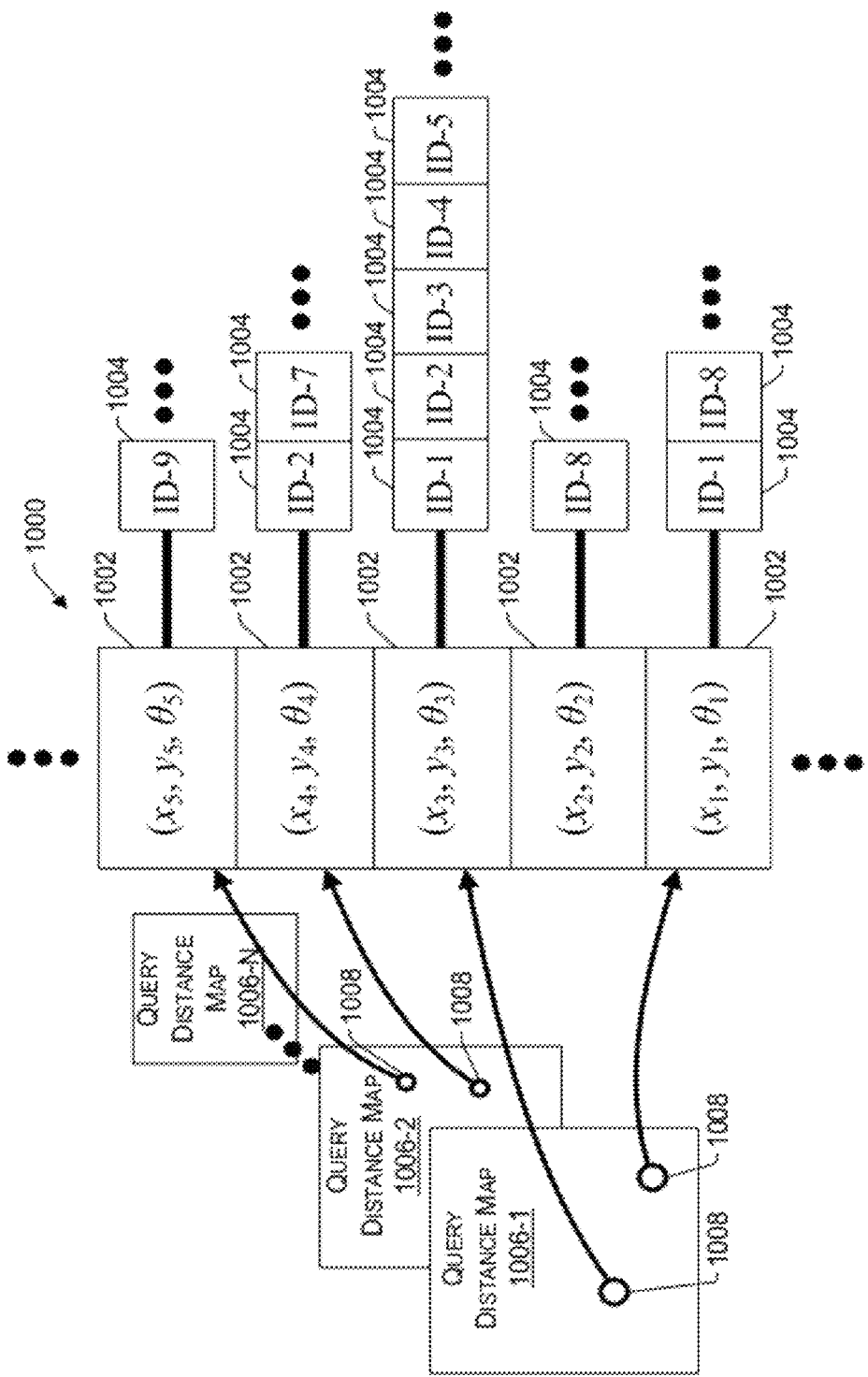
FIG. 10 depicts an example of an index structure according to some implementations.

FIG. 10 illustrates an example of an indexing scheme for an index 1000 for database-to-query matching according to some implementations. According to these implementations the oriented points identified from the salient curves are considered as visual words to be matched in the index 1000. The index 1000 is generated as an inverted list based on using the oriented points (x, y, θ) as visual words 1002, so that images that contain a particular oriented point in a salient curve are associated with that particular oriented point by an image identifier (ID) 1004. For example, suppose that the user interface provides a 200×200 pixel panel in which a user may draw a sketch query input. Further suppose that the images have been down sampled to a maximum resolution of 200×200 prior to identifying the salient curves in each image. Consequently, in this implementation, there are 40,000 pixels in the sketch input panel, each of which may have an orientation or direction. Further, suppose that number of possible orientations is limited to six orientations (i.e., 30 degree increments). Thus, in this example, the database-to-query matching index 1000 would have 240,000 possible visual words, or six visual words for each pixel. Each image in the database has one or more salient curves made up a plurality of oriented points. Accordingly, during the offline indexing stage, each oriented point on each of the salient curves of an image may be matched to one of the visual words 1002 in the index 1000. The image ID 1004 is then listed in the index 1000 as one of the images corresponding to that visual word.

When conducting a search based on a received sketch query input, a number of distance maps 1002-1, 1002-2, . . . , 1002-N, may be created for the sketch input, such as the binary maps discussed above with reference to FIG. 8, based on different orientations or channels of the sketch query curve and taking into account a specified tolerance radius. Consequently, when a sketch query input is received as a search task, all the non-zero oriented points of the sketch query distance maps (i.e., the x, y coordinates together with the channel orientation) compose a collection of visual words. The collection of visual words from the sketch query is matched with the visual words 1002 serving as the index entries in the index 1000. Inverted lists of image IDs 1004 are retrieved and merged to generate a ranking list according to the number of occurrences of each image ID 1004.

In some implementations herein the memory used for the index 1000 was found to be approximately 3.7 GB for 2.1 million images, which is acceptable for conventional computing devices. For example, each image ID may be stored using four bytes, which allows for over four billion different image IDs. Furthermore, the time complexity is Ω(P•L), where P is the number of non-zero points of the query distance map and L is the average length of index entries. In the example discussed above having 2.1 million images, the maximum length of the index entries was found to less than 20000 entries. Thus, for each point in the distance map of the sketch query, implementations scan at most 20 thousand image IDs, rather than all of the 2.1 million images in the database. In some implementations herein, a typical search operation processing time has been observed to be less than one second when matching a sketch query. The index structure described herein inherently speeds up the search process by automatically avoiding unmatched points in the database.

The one-way Chamfer similarity matching process based on the index 1000 described above may suffer from problems in which some sparse curve maps happen to closely match a curve in the querying area. Consequently, the corresponding images returned may be highly ranked because all points in the curves will hit the distance map of the sketch query, while other curves in the sketch query input are not present in the returned image because the image is a sparse image. Accordingly, users may not be satisfied with such results because they expect more of the sketch query curves to be matched. Thus, according to some implementations herein, these unsatisfactory results may be filtered out by also performing a query-to-database matching.

Indexing for Query-to-Database Matching

For query to database matching implementations herein may construct an index similar to the index 1000 for the distance maps of all database images. With a tolerance radius r being 8 which is an acceptable tolerance value in experiments, the total storage cost for such an index is about 44.7 GB, which cannot be handled by a common computing device. Alternatively, if only the salient curves of database images are indexed, and the distance map for each image is generated online after the sketch query has been received, the time complexity will be $\Omega(M \cdot R)$, where M is the total number of points from all distance maps, and R is the average expansion factor (up to 2r+1) from curve maps to multiple binary distance maps. Typically this time cost will be more than 100 seconds, and thus neither calculating distance maps online, nor pre-storing them in the memory, is manageable using conventional computing devices such as single server. However, while the above-discussed two-way indexing and matching scheme is currently not manageable with many conventional computing devices, it can be implemented on specially designed computing devices having sufficient memory and/or parallel computing power. Consequently, after obtaining the image ID lists retrieved from database-to-query and query-to-database matching, the final resulting image list may be easily calculated according to Equation (6).

Efficient Indexing for Approximate Matching

Rather than requiring one or more specialized computing devices for performing the full query-to-database indexing and matching described above, some implementations herein may use an approximate query-to-database matching instead. According to these implementations, database-to-query matching is used initially to determine the top N candidate images. Then, distance maps are generated online for the N candidate images. Equation (6) can then be used to rank the N candidate images. Experiments by the inventors herein have shown that this approach produces satisfactory results. Consequently, the locality-sensitive curve indexing framework provides an online system to efficiently and precisely match sketch queries against millions of images. For the example, with the 2.1 million-image database described above, the total memory cost was made up of two primary parts, namely, 3.7 GB for indexing, and 2.8 GB containing the raw curve features for the online generation of distance maps during the approximate query-to-database matching, totaling 6.5 GB. The retrieval time was found to be about one second in this example.

Multiple Indexes

As discussed above with reference to FIG. 5, some implementations herein provide an interactive image search system which consists of a backend indexing system and a frontend sketch-based search interface. Further, some implementations enable users to search images by combining sketches, text, and color in a query input. Therefore, the indexing portion of implementations herein may provide a combination of multiple different indexes.

In addition to the sketch-based search features discussed herein, implementations may also extract and index color features and text or tag features from images. If images have text or tags associated with them, then utilizing such text or tags provides a convenient means for overcoming a semantic gap between a sketch input and the results. Depending on the types of images being indexed and the source of the images, text and tags can be obtained in several different ways. For user-generated images, most of which exist in photo forums and photo-sharing websites, the photographers are likely to label the photographs using one or more keywords. For images in typical web pages and in other online sources, it is possible to extract surrounding text by parsing the web pages. Thus, the text-based index may be a typical keyword search index, with images being associated with relevant keywords by their image IDs.

Furthermore, for generating the color-based index, implementations herein may extract one or more dominant colors from each image. In some implementations, the three most dominant colors for each image are detected by computing a color histogram in the HSV (hue, saturation, and value) color space, although implementations herein are not limited to any particular color space models. The color histogram represents the distribution of the colors in an image such as by representing the number of pixels that have colors in each of a fixed list of color ranges that span the images' color space i.e., the set of possible colors. Furthermore, in some implementations, when building the color histogram for an image, the weight of each pixel may be penalized by its distance to the center of the image. Therefore, an index of colors can be created, with each image being associated with at least one color in the index by the image ID.

Accordingly, to enable a real-time interactive image search, implementations herein provide efficient indexing structures for each of the sketch, text and color features. Since all image features, i.e., sketch, text and dominant colors may be represented by discrete "words", implementations herein adopt inverted files to generate the indexes. Given a query, which may consist of one or more of the three possible query types, implementations herein compute a score based on each of the three indexes, and may linearly combine the three separate scores to obtain a final score. In the example discussed above with 2.1 million images, the total memory cost of the system including the three indexes was found to be less than 7 GB.

User Interface

Figure 11:
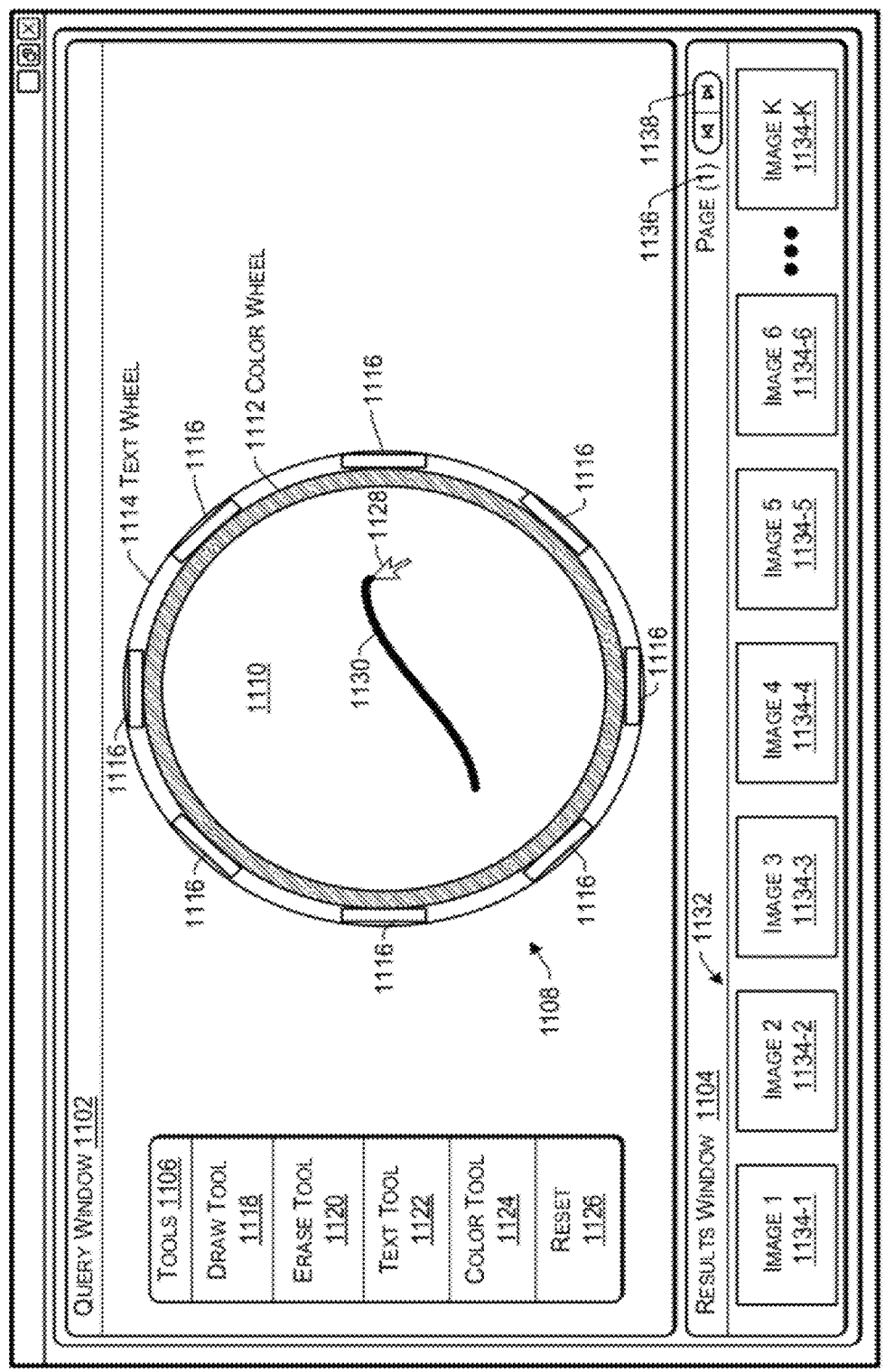
FIG. 11 depicts an example of a user interface according to some implementations.

FIG. 11 is an example of a user interface 1100 according to some implementations. In order to enable submission of sketch query inputs, the user interface 1100 may support multiple image elements as sketch queries to enable users to express or refine their search intentions. User interface 1100 includes a query window 1102 for receiving a query, and a results window 1104 for displaying the results of the query to a user. The query window 1102 includes a toolbar 1106 and a query input interface 1108. The query input interface 1108 may include a canvas or input panel 1110 as an area where users may express their ideas. In the illustrated example, the input panel 1110 is a circular interface upon which users may directly draw, freely drag elements onto it, or type in text to construct a final query. Further, while a circular input panel is shown in this example, the input panel 1110 is not limited to any particular shape, and may be square, rectangular, etc. In some implementations, the input interface 1108 may include an inner peripheral ring-shaped color wheel 1112 that can be used for selecting a color to include in the query. Additionally, in some implementations, the input interface 1108 may include an outer peripheral ring-shaped text wheel 1114 that contains various text tags or keywords 1116 that may be dragged into the input panel 1110 for including one or more commonly used or recently used keywords in the search query.

The toolbar 1106 may include a variety of tools for submitting queries, such as a draw tool 1118, and an erase tool 1120, a text tool 1122, a color tool 1124, and a reset button 1126. For example, the user may select the draw tool 1118 and use a mouse pointer 1128 to draw one or more lines or curves 1130 on the input panel 1110 as a sketch query input. The user may then click outside the input interface 1108, such as anywhere in the query window 1102 to submit the curve 1130 as a sketch query. Alternatively, rather than using a mouse pointer, in some implementations in which a touch screen is available to the user, the user may use a finger tip or stylus in place of the mouse pointer 1128 for carrying out any of the interactions with the user interface described herein. Additionally, the user may use the erase tool 1122 to erase a portion of a drawn sketch. The text tool 1122 may be used to open a text block window for submitting a text query along with a sketch query. The color tool 1124 may be used to open the color wheel for selecting a color to be submitted with the sketch query, and the reset button 1126 may be selected to reset the input interface 1108 to the default ready position for receiving new input.

The results window 1104 includes a display area 1132 which displays one or more images 1134-1, 1134-2, ..., 1134-K as the results in response to a query. For example, the results window may display the plurality of images 1134 arranged in one or more rows of images or image thumbnails and as one or more pages that may be browsed through by the user, with the number of images being returned in a one-page being dependent on the displayed size of the image 1134. Typically the highest-ranked images are represented first in order of rank from left to right. In some implementations, the user may drag one of the images 1134 from the results window into the query window to view an enlarged view of the image. To aid user navigation, the results window may include a page indicator 1136, and a page forward and page back control 1138.

Figure 12:
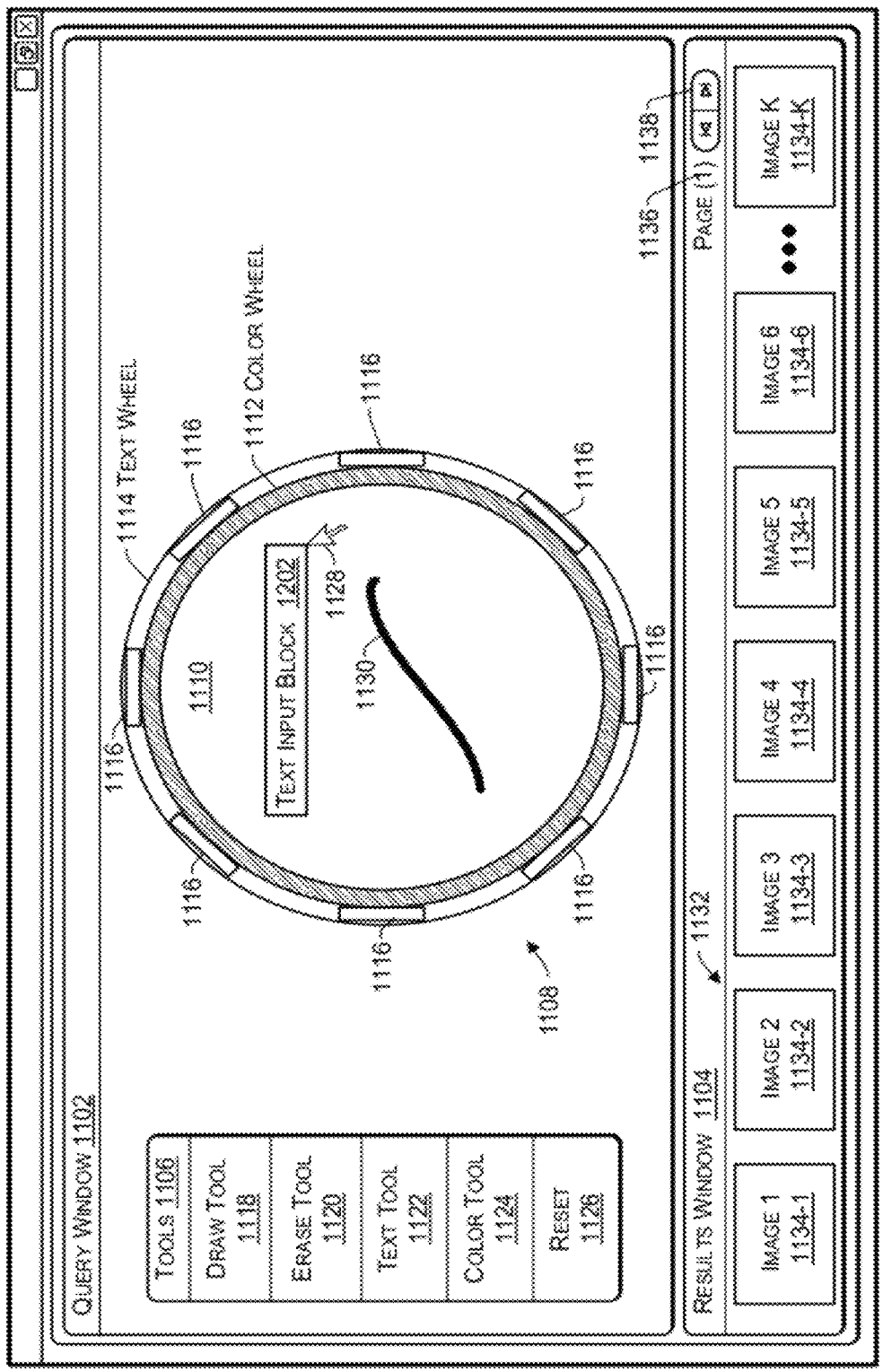
FIG. 12 depicts an example of the user interface with text input according to some implementations.

FIG. 12 illustrates an example in which the user interface 1100 may be used to submit both a text query and sketch query. In this example, the user may select the text tool 1122 with the mouse pointer 1128 and generate a text input block 1202 in the input panel 1110. The user may then type one or more desired keywords or text tags in the text input block 1202 and submit a text query along with a sketch query 1130. According to some implementations herein, the order of input does not make a difference. For example, the user may first draw one or more sketch curves 1130, and then type in a keyword, or the user may type in the keyword first, and then draw in a curve and/or select a color. As another example, the user may draw one or more curves 1130, enter a keyword in text input block 1202, and then draw one or more additional curves, such as for interactively refining the sketch query in response to results displayed as feedback in the results window 1104.

Figure 13:
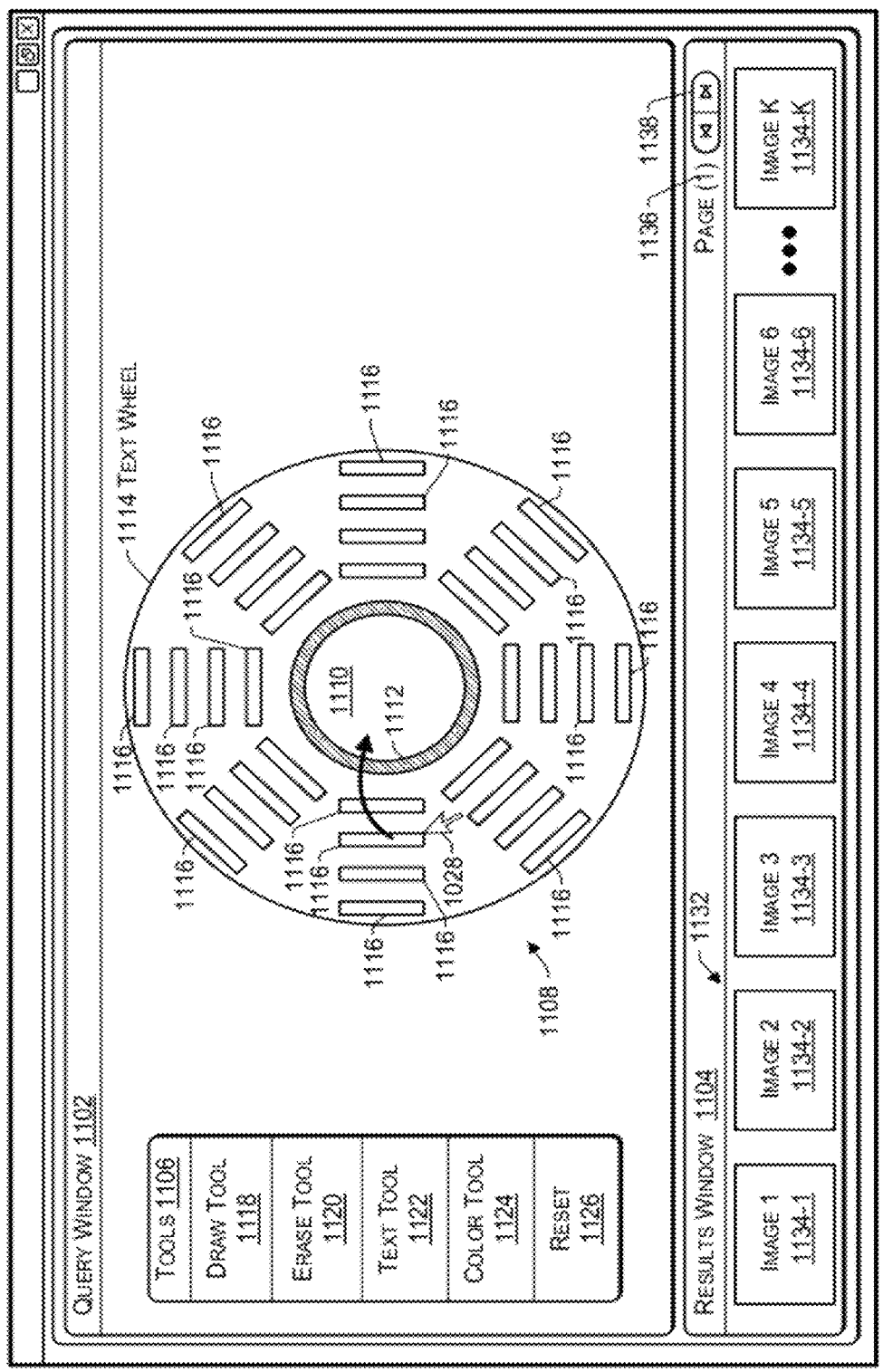
FIG. 13 depicts an example of the user interface with text wheel input according to some implementations.

FIG. 13 illustrates use of the text will 1114 for entering one or more predetermined keywords as text queries. For example, the text wheel 1116 may be expanded inward as shown in FIG. 13 to display a plurality of keywords 1116 arranged radially about the center of the input panel 1110. The user may use pointer 1128, a finger, etc., to select and drag one or more of the keywords 1116 on to the input panel 1110 for submitting the keyword 1116 as a text query. For example, the keywords 1116 may be keywords that have been recently entered by the user as input for text queries, and/or may be keywords or tags selected from the text index 514, such as some of the more commonly occurring words in the text index 514, or the like. When the user has selected the keyword 1116 and dragged the keyword into the input panel 1110, the user may collapse the text wheel back to its original configuration and input any additional query parameters such as drawing a sketch query and/or selecting a color query.

Figure 14:
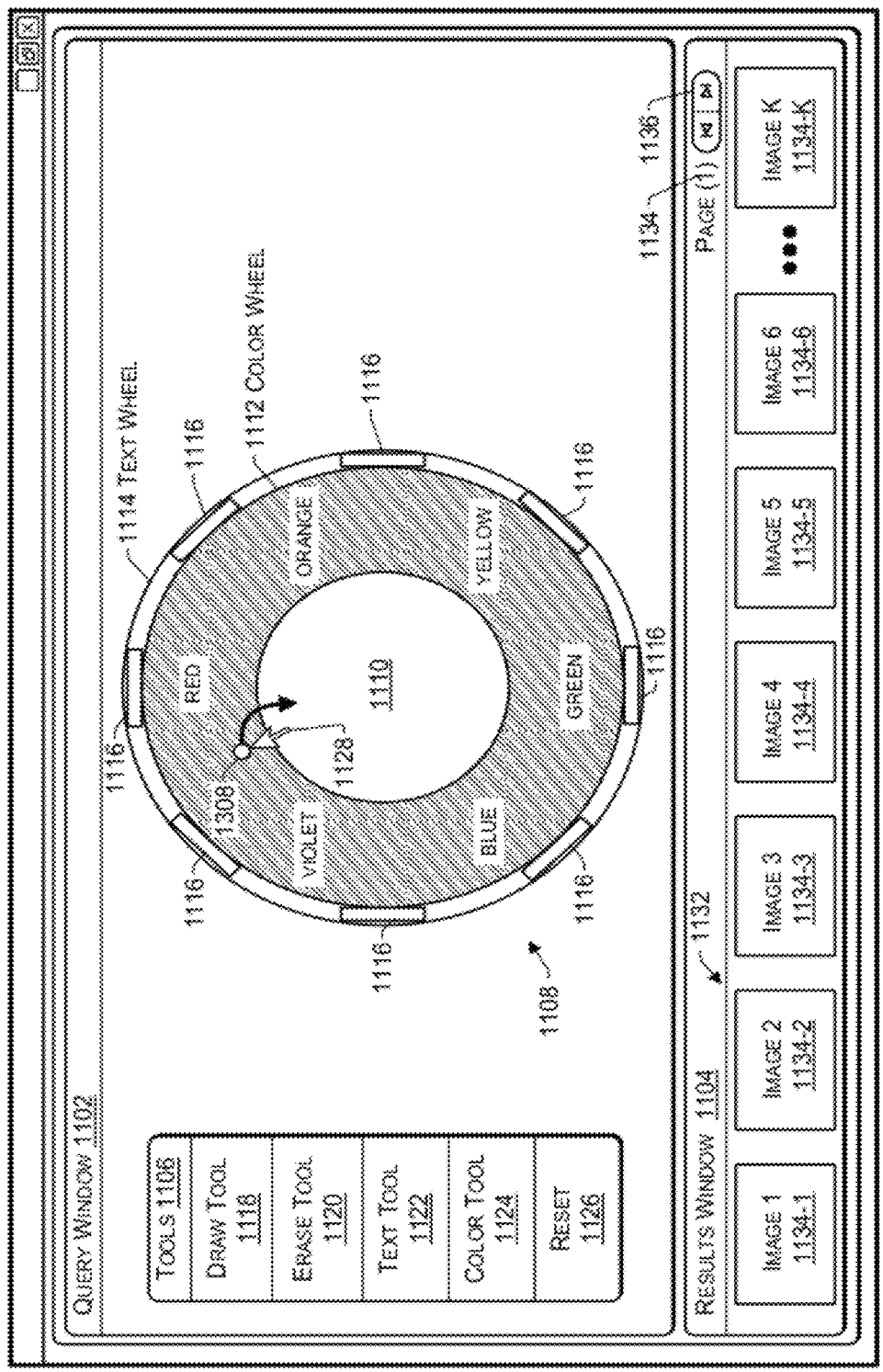
FIG. 14 depicts an example of the user interface with color wheel input according to some implementations.

FIG. 14 illustrates an example of selecting a color from the color wheel 1112 for submission as a color query according to some implementations. For example, the user may expand the color wheel 1112 inward toward the center of the input panel 1110 to more fully display the color wheel 1112. The color wheel may include a typical HSV type continuous color display of a plurality of primary and secondary colors, i.e. red, orange, yellow, green, blue, and violet and, with rainbow-style color transition areas between the primary and secondary colors. To select a color, the user may use the mouse pointer 1128 to click on a color at a desired location of the color wheel 1012. The user may then drag a spot of the color 1402 into the input panel 1110 so that the color selected for use in the color query remains apparent. As mentioned above, the color may be selected before or after other query inputs, such as text input or sketch input. Further, the color may be changed interactively in response to the results by merely selecting and dragging an alternative color into the input panel 1110.

Example Indexing Process

Figure 15:
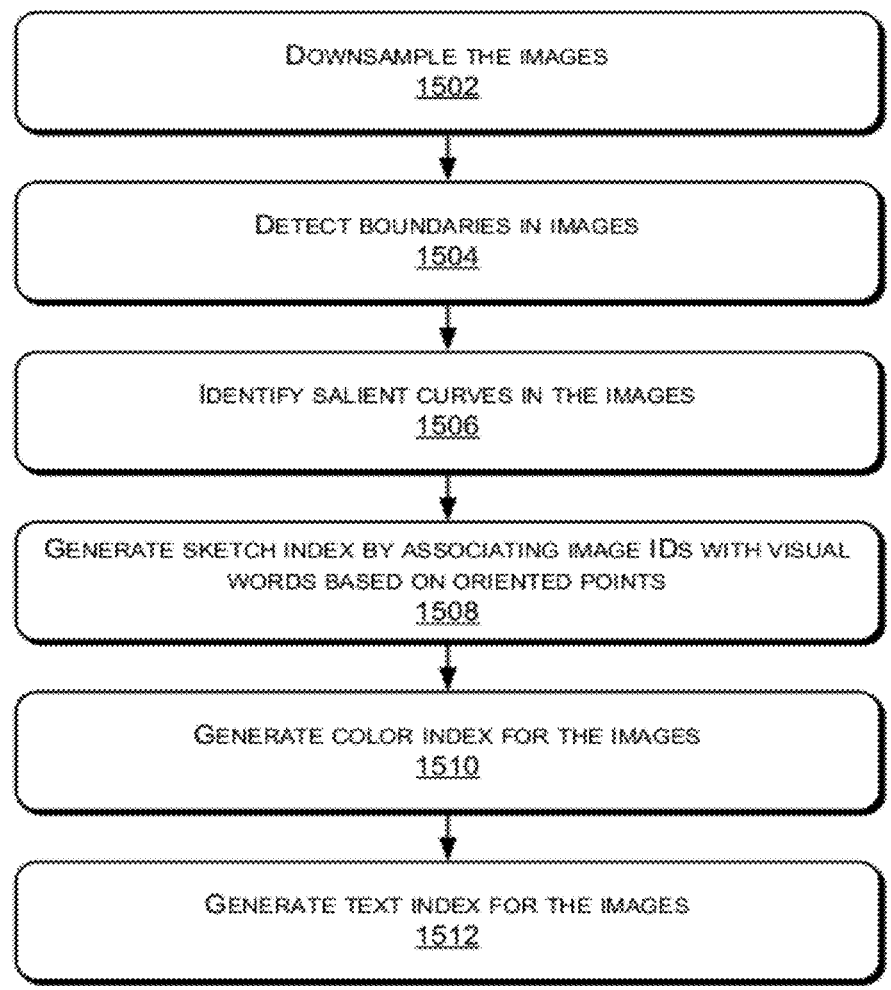
FIG. 15 is a flow diagram of an example of an indexing process according to some implementations.

FIG. 15 is a flow diagram of an example of an indexing process 1500 according to some implementations herein. In the flow diagram, the operations are summarized in individual blocks. The operations may be performed in hardware, or as processor-executable instructions (software or firmware) that may be executed by one or more processors. Further, the process 1000 may, but need not necessarily, be implemented using the framework of FIG. 5.

At block 1502, the images being indexed are down sampled to reduce the resolution of the images to a maximum predetermined resolution. According to some implementations, the images may be down sampled to have a resolution of less than 256×256 pixels. For example, the images may be down sampled to have a resolution in which the maximum length of the image is equal to 200 pixels. In some implementations, the maximum resolution of the images may be the same as or related to the resolution of the user interface input panel 1110.

At block 1504, the boundary curves for the image are identified. For example, a boundary detector may be used to detect the boundaries in the image based on differences in color, texture, brightness, and the like.

At block 1506, the salient curves in the image are identified from the boundary curves. For example, the salient curves may be identified based on a modified Connected Graph Algorithm. Under the modified Connected Graph Algorithm herein, two points are connected when the two points are adjacent and also have a similar local orientation or direction. The sets of connected vertices or points are so-called continuous curves that are candidate salient curves. Long and continuous curves typically belong to more salient objects. Accordingly, some implementations herein filter out short curves having a length less than a predetermined threshold. For example, the threshold may be set to eliminate curves have a length "Ls" that is less than 40 pixels, although other suitable thresholds may also be used.

At block 1508, the image index for database-to-query matching is generated by relating the oriented points in the salient curves of the images with the oriented points listed as visual words in the index. Thus, for each oriented point contained in a salient curve represented in image, the image ID is associated with that visual word in the index. Additionally, in some implementations, a second image index is generated based on one or more distance maps created for each image for use in query-to-database matching.

At block 1510, the color index is generated for the images. This operation may be carried out before, during, or after the generation of the sketch matching image index. The color index is generated by creating a color histogram for each image and identifying one or more dominant colors in each image. In some implementations, the color index may be generated using the down sampled images generated in block 1502.

At block 1512, the text index is generated for the images. This operation may be carried out before, during, or after the generation of the sketch matching image index and/or the color index. For example, the text index is generated by detecting tags that have been provided with the images, or by detecting text that is located with or associated with the images, such as in a webpage.

Example Search Process

Figure 16:
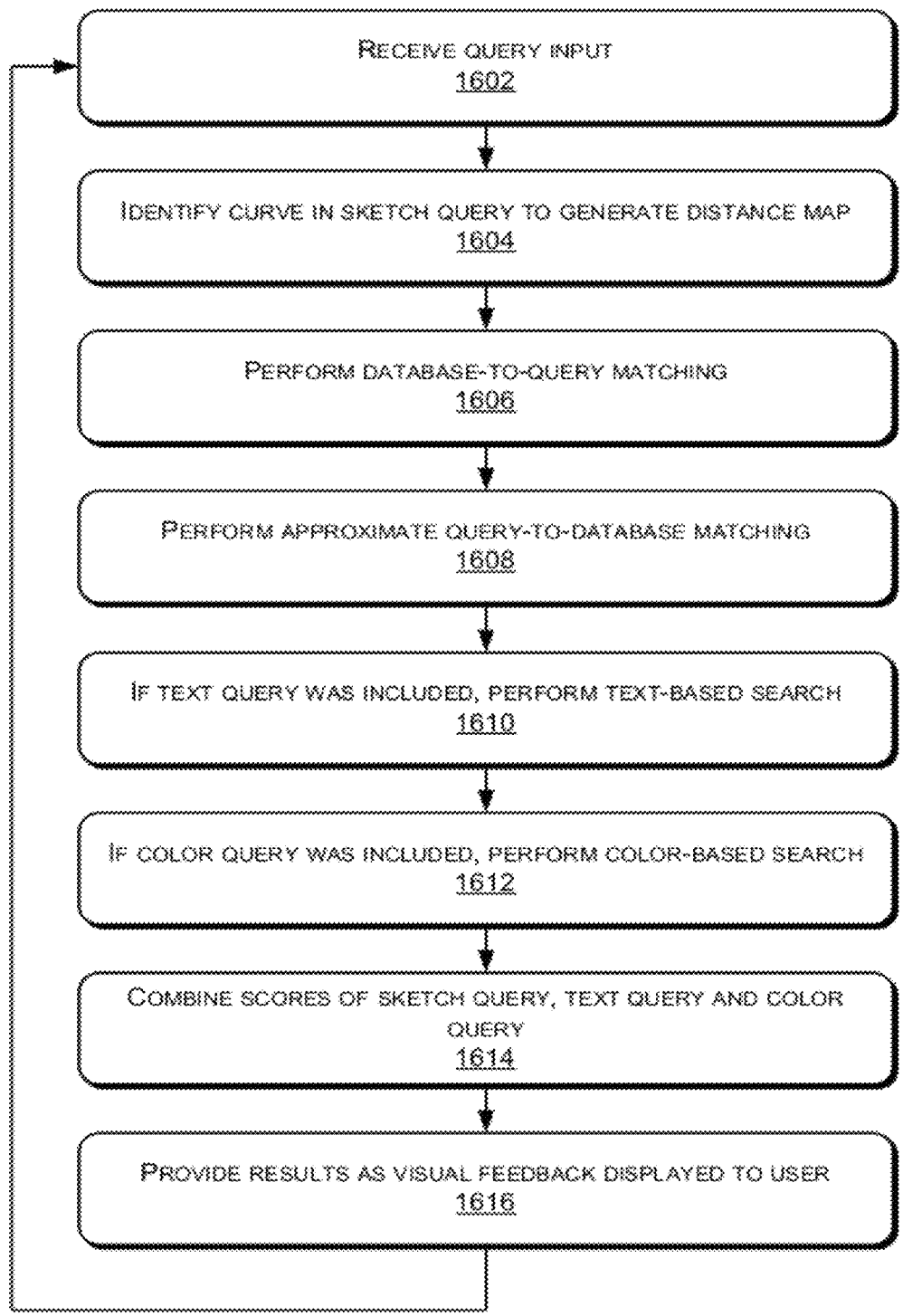
FIG. 16 is a flow diagram of an example process for sketch-based, text-based and/or color-based searching according to some implementations.

FIG. 16 depicts a flow diagram of an example of a sketch-based image search process according to some implementations herein. In the flow diagram, the operations are summarized in individual blocks. The operations may be performed in hardware, or as processor-executable instructions (software or firmware) that may be executed by one or more processors. Further, the process 1600 may, but need not necessarily, be implemented using the framework of FIG. 5.

At block 1602, a query input is received from a user. For example, the query input may include any combination of a sketch query input, a text query input, and/or a color query input.

At block 1604, one or more curves in the sketch query are identified and one or more distance maps are generated. For example, a plurality of binary distance maps may be generated for representing different portions of each identified curve having a different orientation. Further, the binary distance maps may each include a specified tolerance radius or value for providing a tolerance range of oriented points in the area around the curve.

At block 1606, the oriented points in the one or more distance maps are matched with the image index to perform database-to-query matching. For example, each of the points in the distance maps may be matched with the visual words in the index to identify corresponding images having the same points.

At block 1608, approximate query-to-database matching is performed on the results of the database to query matching. For example, the top N results may be selected and for those top N images, distance maps may be generated. A symmetric locally robust Chamfer similarity is then calculated based on the generated distance maps using equation (6) set forth above to determine the rank for the top N images. In other implementations, full query-to-database matching is performed using the second image index generated from distance maps for each of the images.

At block 1610, if a text query was included with the query received at block 1602, a text-based search is carried out on the images in the database using the text index.

At block 1612, if a color query was included with the query received at block 1602, a color-based search is carried out on images in the database using the color index.

At block 1614, the scores of the results of the sketch query, the text query, and the color query are combined to generate total scores for each of the located images. In some implementations, the scores of the three different query types may be combined linearly.

At block 1616, the images having the highest scores are returned as the results and displayed as feedback to the user that submitted query. If the user is not satisfied with the results displayed, the user may refine the query interactively by adding curves to or removing curves from the sketch query, modify the text query, and/or modify the color query.

Accordingly, implementations herein provide for sketch-based image search with efficient curve matching and scalable indexing. The sketch-based image search system herein enables real-time interactive sketch-to-image matching and significantly outperforms existing sketch-based systems. Furthermore, implementations herein provide indexing techniques to enable indexing of huge quantities of images for sketch based image search Implementations herein also support multi-modality query inputs including sketch, text and color so that users can more precisely formulate their query intentions. Experimental results on different search tasks have shown the effectiveness and efficiency of the proposed framework.

Example System

Figure 17:
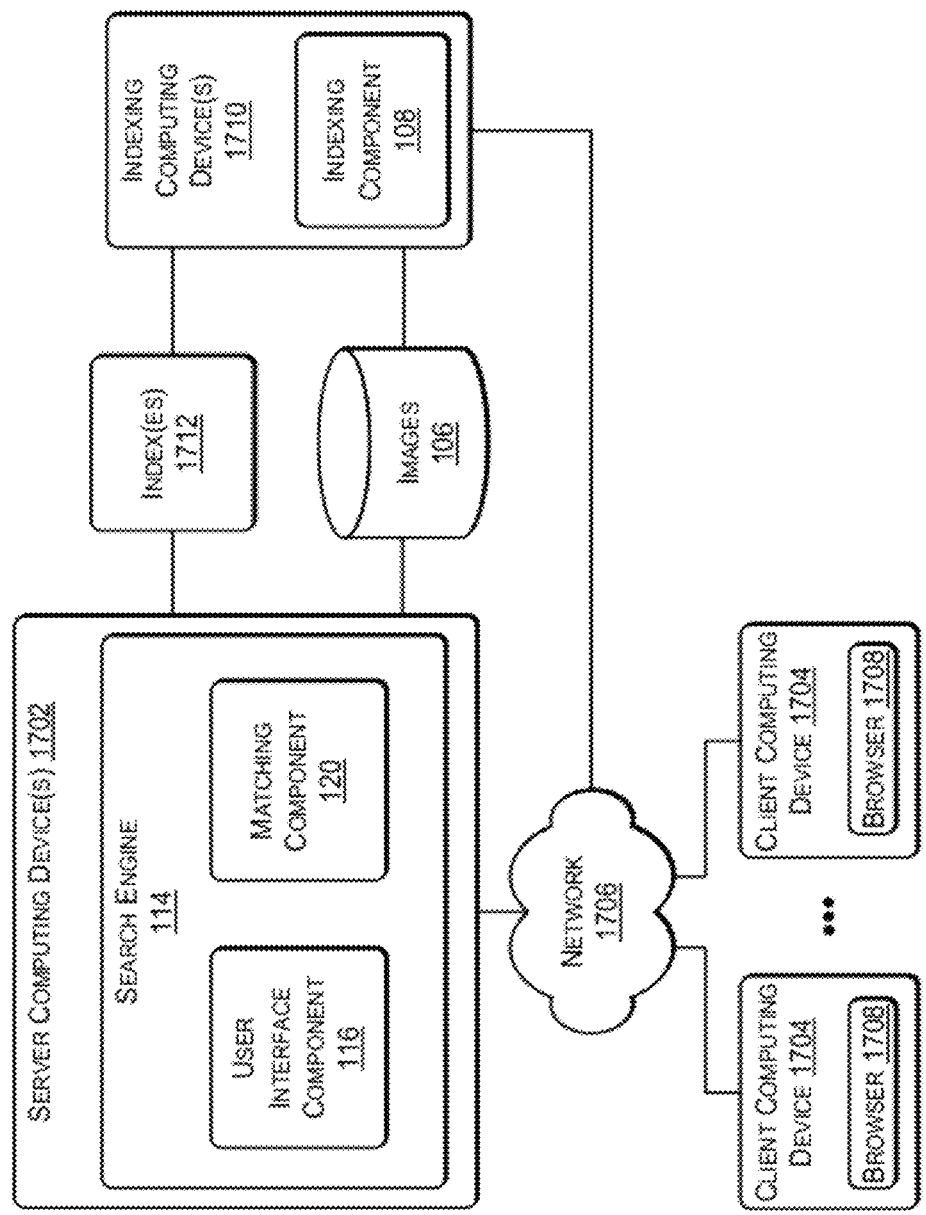
FIG. 17 is a block diagram of an example system for sketch-based image search according to some implementations

FIG. 17 illustrates an example of a system 1700 for carrying out sketch-based image searching according to some implementations herein. To this end, the system 1700 includes one or more server computing device(s) 1702 in communication with a plurality of client or user computing devices 1704 through a network 1706 or other communication link. In some implementations, server computing device 1702 exists as a part of a data center, server farm, or the like, and is able to serve as a component for providing a commercial search website. The system 1700 can include any number of the server computing devices 1702 in communication with any number of client computing devices 1704. For example, in one implementation, network 1706 includes the World Wide Web implemented on the Internet, including numerous databases, servers, personal computers (PCs), workstations, terminals, mobile devices and other computing devices spread throughout the world and able to communicate with one another. Alternatively, in another possible implementation, the network 1706 can include just a single server computing device 1702 in communication with one or more client devices 1704 via a LAN (local area network) or a WAN (wide area network). Thus, the client computing devices 1704 can be coupled to the server computing device 1702 in various combinations through a wired and/or wireless network 1706, including a LAN, WAN, or any other networking technology, using one or more protocols, for example, a transmission control protocol running over Internet protocol (TCP/IP), or other suitable protocols.

In some implementations, client computing devices 1704 are personal computers, workstations, terminals, mobile computing devices, PDAs (personal digital assistants), cell phones, smartphones, laptops, tablet computing devices, or other computing devices having data processing capability. Furthermore, client computing devices 1704 may include a browser 1708 for communicating with server computing device 1702, such as for presenting the user interface herein to a user and for submitting a search query to the server computing device 1702. Browser 1708 may be any suitable type of web browser such as Internet Explorer®, Firefox®, Chrome®, Safari®, or other type of software configured to enable submission of a sketch-based query for a search as disclosed herein.

In addition, server computing device 1702 may include search engine 114 for responding to sketch-based search queries received from client computing devices 1704. Accordingly, in some implementations, search engine 114 may include user interface component 116 and matching component 120, as described above, for receiving sketch-based queries and/or text queries and/or color queries. In some implementations, user interface component 116 may provide the user interface described herein as a webpage able to be viewed and interacted with by the client computing devices through browsers 1708. In other implementations, browsers 1708 may have an add-in or similar user interface component for generating the user interface 1100 disclosed herein. Other variations will also be apparent in view of the disclosure herein.

Additionally, one or more indexing computing devices 1710 having indexing component 108 may be provided for carrying out the indexing stage 102 disclosed herein. In some implementations, indexing computing device 1710 may be the same computing device as server computing device 1702; however, in other implementations, indexing computing device(s) 1710 may be part of an offline web crawling search facility that indexes images available on the Internet. Thus, in some implementations images 106 are stored multiple websites on the Internet. However, in other implementations, images 106 are stored in a database accessible by server computing device 1702 and/or indexing computing device 1708. As discussed above, indexing component 108 generates one or more indexes 1712 for the images 106, such as the image index 110 for sketch-based search if the images 106, the text index 514 for text-based search of the images, and the color index 512 for color-based search of the images.

Furthermore, while an example system architecture is illustrated in FIG. 17, other suitable architectures may also be used, and that implementations herein are not limited to any particular architecture. For example, in some implementations, indexing component 108 may be located at server computing device 1702, and indexing computing device 1710 may be eliminated. Other variations will also be apparent to those of skill in the art in light of the disclosure herein.

Example Server Computing Device

Figure 18:
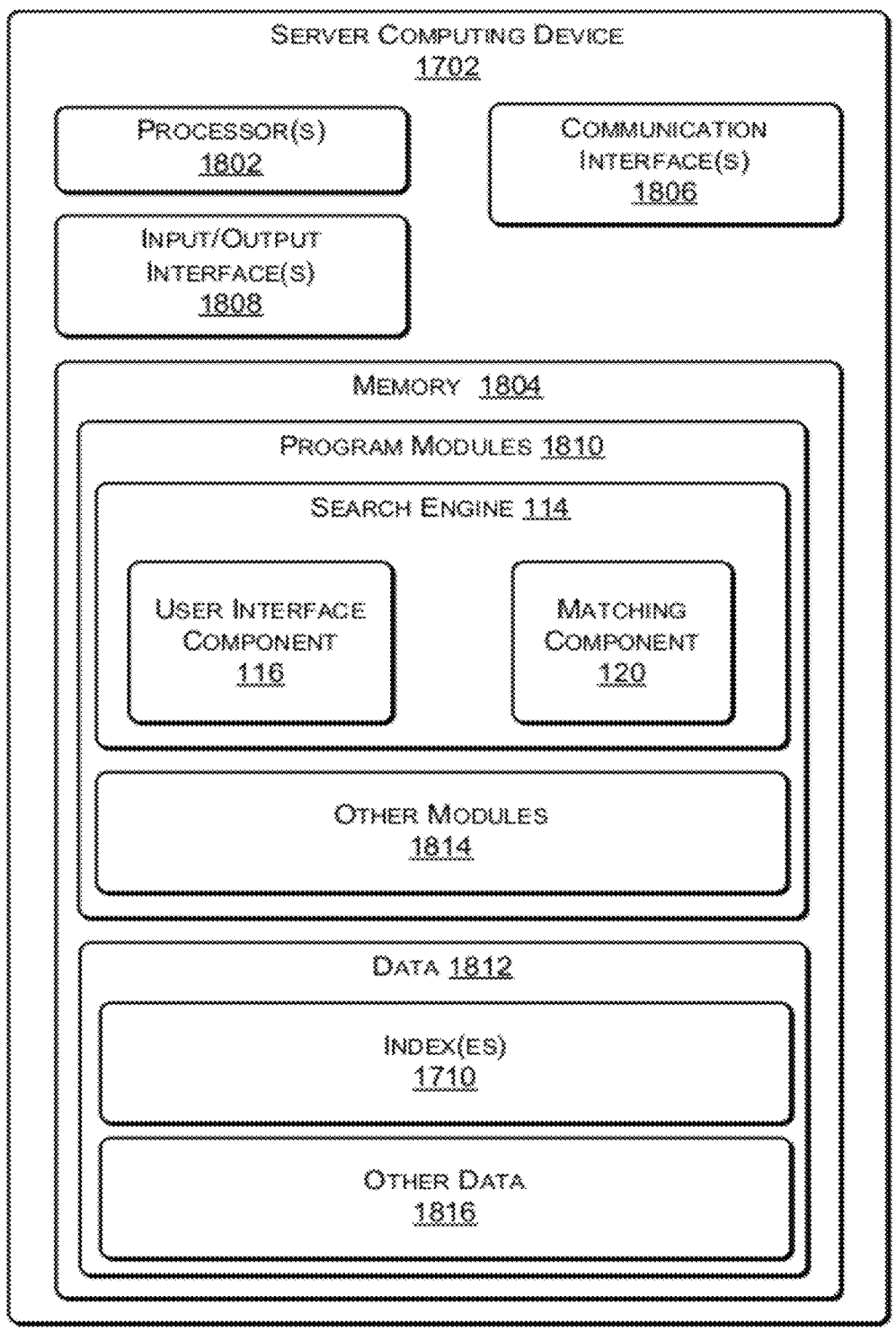
FIG. 18 is a block diagram of an example server computing device according to some implementations.

FIG. 18 illustrates an example configuration of a suitable computing system environment for server computing device 1702 and/or indexing computing device 1710 according to some implementations herein. Thus, while the server computing device 1702 is illustrated, the indexing computing device 1710 may be similarly configured. Server computing device 1702 may include at least one processor 1802, a memory 1804, communication interfaces 1806 and input/output interfaces.

The processor 1802 may be a single processing unit or a number of processing units, all of which may include single or multiple computing units or multiple cores. The processor 1802 can be implemented as one or more microprocessors, microcomputers, microcontrollers, digital signal processors, central processing units, state machines, logic circuitries, and/or any devices that manipulate signals based on operational instructions. Among other capabilities, the processor 1802 can be configured to fetch and execute computer-readable instructions or processor-accessible instructions stored in the memory 1804, mass storage devices 1812, or other computer-readable storage media.

Memory 1804 is an example of computer-readable storage media for storing instructions which are executed by the processor 1802 to perform the various functions described above. For example, memory 1804 may generally include both volatile memory and non-volatile memory (e.g., RAM, ROM, or the like). Further, memory 1804 may also include mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Memory 1804 is capable of storing computer-readable, processor-executable program instructions as computer program code that can be executed on the processor 1802 as a particular machine configured for carrying out the operations and functions described in the implementations herein.

Memory 1804 may include program modules 1810 and data 1812. Program modules 1810 may include the search engine 114 and other modules 1814, such as an operating system, drivers, and the like. As described above, search engine 114 may include the user interface component 116 and the matching component 120, which can be executed on the processor 1802 for implementing the functions described herein. In some implementations, memory 1804 may also include the indexing component 108 for carrying out the indexing functions herein, but in other implementations, indexing component 108 is executed on a separate indexing computing device. Additionally, data 1812 may include the indexes 1710, such as the image index 110, the color index 512 and the text index 514. Data 1812 may also include other data 1816 for use in server operations, such as data for providing a search website, and so forth.

The server computing device 1702 can also include one or more communication interfaces 1806 for exchanging data with other devices, such as via a network, direct connection, or the like, as discussed above. The communication interfaces 1806 can facilitate communications within a wide variety of networks and protocol types, including wired networks (e.g., LAN, cable, etc.) and wireless networks (e.g., WLAN, cellular, satellite, etc.), the Internet and the like.

Example Client Computing Device

Figure 19:
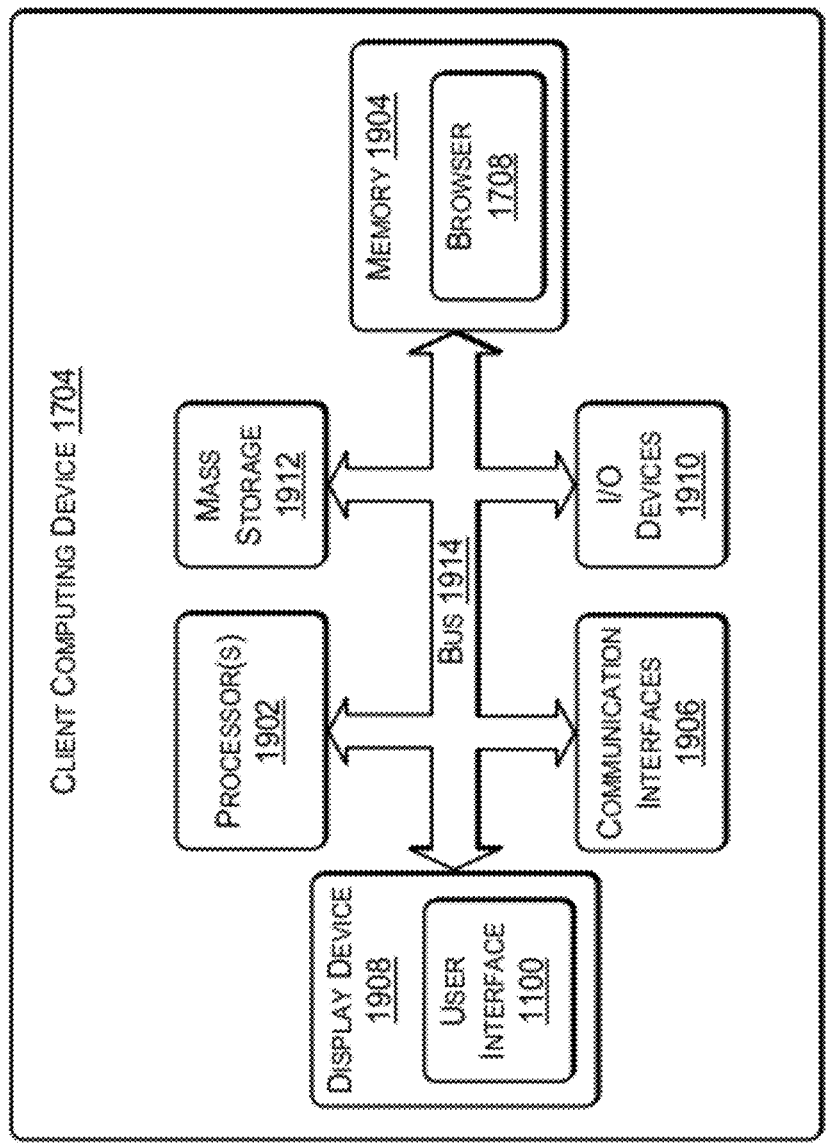
FIG. 19 is a block diagram of an example client computing device according to some implementations.

FIG. 19 illustrates an example configuration of a suitable computing system environment for client computing device 1704 according to some implementations herein. client computing device 1704 may include at least one processor 1902, a memory 1904, communication interfaces 1906, a display device 1908, input/output (I/O) devices 1910, and one or more mass storage devices 1912, all able to communicate through a system bus 1914 or other suitable connection.

The processor 1902 may be a single processing unit or a number of processing units, all of which may include single or multiple computing units or multiple cores. The processor 1902 can be implemented as one or more microprocessors, microcomputers, microcontrollers, digital signal processors, central processing units, state machines, logic circuitries, and/or any devices that manipulate signals based on operational instructions. Among other capabilities, the processor 1902 can be configured to fetch and execute computer-readable instructions or processor-accessible instructions stored in the memory 1904, mass storage devices 1912, or other computer-readable storage media.

Memory 1904 and mass storage devices 1912 are examples of computer-readable storage media for storing instructions which are executed by the processor 1902 to perform the various functions described above. For example, memory 1904 may generally include both volatile memory and non-volatile memory (e.g., RAM, ROM, or the like). Further, mass storage devices 1912 may generally include hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Both memory 1904 and mass storage devices 1912 may be collectively referred to as memory or computer-readable storage media herein. Memory 1904 is capable of storing computer-readable, processor-executable program instructions as computer program code that can be executed on the processor 1902 as a particular machine configured for carrying out the operations and functions described in the implementations herein. Memory 1904 may include browser 1708 for enabling a user to submit a sketch-based query. For example, browser 1708 may display user interface 1100 as a web page on display device 1908 for receiving search queries, as described above. Alternatively, in other implementations, memory 1904 may include at least a portion of user interface component 116 for generating the user interface 1100 on display device 1908.

The client computing device 1704 can also include one or more communication interfaces 1906 for exchanging data with other devices, such as via a network, direct connection, or the like, as discussed above. The communication interfaces 1906 can facilitate communications within a wide variety of networks and protocol types, including wired networks (e.g., LAN, cable, etc.) and wireless networks (e.g., WLAN, cellular, satellite, etc.), the Internet and the like.

The display device 1908, such as a monitor, display, or touch screen, may be included in some implementations for displaying the user interface 1918 and/or an input image to a user. I/O devices 1910 may include devices that receive various inputs from a user and provide various outputs to the user, such as a keyboard, remote controller, a mouse, a camera, audio devices, and so forth. In the case in which display device 1908 is a touchscreen, the display device 1908 can act as input device for submitting queries, as well as an output device for displaying results.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or applications, and may be implemented in general purpose and special-purpose computing systems, or other devices having processing capability.

Additionally, the components, frameworks and processes herein can be employed in many different environments and situations. Generally, any of the functions described with reference to the figures can be implemented using software, hardware (e.g., fixed logic circuitry) or a combination of these implementations. The term "engine," "mechanism" or "component" as used herein generally represents software, hardware, or a combination of software and hardware that can be configured to implement prescribed functions. For instance, in the case of a software implementation, the term "engine," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices or media. Thus, the processes, components and modules described herein may be implemented by a computer program product.

Although illustrated in FIG. 18 as being stored in memory 1804 of server computing device 1702, search engine 114 and indexing component 108, or portions thereof, may be implemented using any form of computer-readable media that is accessible by server computing device 1702 and/or indexing computing device 1710. Computer-readable media may include, for example, computer storage media and communications media. Computer storage media is configured to store data on a non-transitory tangible medium, while communications media is not.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Implementations herein provide an interactive real time sketch-based search system. Further, some implementations enable indexing of huge quantities of images. Additionally, some implementations provide a user interface that allows users to flexibly formulate queries using any combination of sketch inputs, text inputs and color selection inputs.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A system comprising:
a processor in communication with computer-readable storage media;
a down-sampling component to reduce resolution of a plurality of images to generate a plurality of down-sampled images;
an index maintained in the computer-readable storage media, the index comprising a first set of direction-oriented points associated with a subset of image curves detected for the plurality of down-sampled images, individual of the direction-oriented points specifying a position of a particular point of an image and a direction from which an associated image curve passes the position, wherein the subset of image curves for a particular down-sampled image includes one or more salient curves identified by filtering the image curves detected for the particular down-sampled image to remove image curves having a length less than a predetermined threshold;

a user interface component to receive a query curve as a search query input; and a salient curve component to:
 determine that a length of the query curve is above a threshold length; and
 in response to determining that the length of the query curve is above the threshold length, divide the query curve into a plurality of sub-query curves, each of the plurality of sub-query curves being treated as the sketch query input.

2. The system according to claim 1, further comprising:
a matching component, maintained in the computer-readable storage media and executed on the processor, for matching a subset of a second set of direction-oriented points based at least in part on the query curve with the first set of direction-oriented points associated with the plurality of down-sampled images, the matching component configured for identifying images of the plurality of down-sampled images based at least in part on the matching, wherein the matching component generates a distance map for the query curve, the distance map representing the query curve as the second set of direction-oriented points.

3. The system according to claim 2, wherein the distance map generated for the query curve includes a tolerance value that specifies a predetermined range of oriented points in an area around the query curve to be used in the matching.

4. The system according to claim 1, wherein:
 the user interface component is configured to receive at least one of a text-based query or a color-based query in conjunction with the query curve as the search query input; and
 the matching component is configured to identify one or more additional images based on at least one of the text-based query or the color-based query, and combine a ranking score of the one or more additional images with a ranking score of a plurality of images identified based on the query curve to identify a plurality of ranked images as a search result.

5. The system according to claim 1, further comprising an indexing component for generating the index based, at least in part, on the plurality of down-sampled images, the indexing component generating the index by relating the first set of direction-oriented points with image identifiers based at least in part on the one or more salient image curves.

6. The system of claim 1, further comprising:
a color index maintained in the computer-readable storage media, the color index providing a plurality of colors as color index entries, wherein one or more down-sampled images of the plurality of down-sampled images are associated with at least one color index entry based at least in part on one or more dominant colors detected in the one or more down-sampled images;
 wherein the user interface component is further configured to receive a color query input; and
 wherein the matching component is further configured for identifying the down-sampled images based at least in part on matching a color specified by the color query input with the color index.

7. The system of claim 1, further comprising:
a text index maintained in the computer-readable storage media, the text index providing a plurality of keywords as text index entries, wherein one or more down-sampled images of the plurality of down-sampled images are associated with at least one text index entry based at least in part on text detected in the one or more down-sampled images;
 wherein the user interface component is further configured to receive a text query input; and
 wherein the matching component is further configured for identifying the down-sampled images based at least in part on matching the text query input with the text index.

8. A method comprising:
receiving a first continuous curve;
receiving a second continuous curve;
determining that a length of the first continuous curve is less than a threshold length; and
in response to the determining that the length of the first continuous curve is less than the threshold length, including the first continuous curve with the second continuous curve to create a query curve as a sketch query input;
identifying a first plurality of direction-oriented points based at least in part on the query curve, wherein each direction-oriented point of the first plurality of direction-oriented points specifies a position of a particular point of the sketch query input and a direction from which the query curve passes the position; and
using, by a processor, the first plurality of direction-oriented points to locate at least one down-sampled image having a salient curve that includes a second plurality of direction-oriented points that match a portion of the first plurality of direction-oriented points based at least in part on the query curve, wherein one or more salient curves for a particular down-sampled image are identified by filtering image curves detected for the particular down-sampled image to remove image curves having a length less than a predetermined threshold.

9. The method according to claim 8, wherein a plurality of down-sampled images is located based on the first plurality of direction-oriented points, the method further comprising:
 generating one or more distance maps for image curves in individual down-sampled images of the plurality of down-sampled images;
 calculating a similarity between the query curve and the generated distance maps; and
 ranking the individual down-sampled images of the plurality of down-sampled images based at least in part on the calculated similarity.

10. The method according to claim 8, wherein a first plurality of images is located in a database of images based on the first plurality of direction-oriented points, the method further comprising:
 matching the query curve with distance maps generated for image curves identified in individual images in the database of images to obtain a second plurality of images; and identifying a third plurality of images from the first plurality of images and the second plurality of images as results in response to the sketch query input.

11. The method according to claim 8, wherein identifying a first plurality of direction-oriented points based on the query curve further comprises generating one or more distance maps for the query curve, each distance map representing a curve portion having a determined direction, the distance map identifying a subset of the first plurality of direction-oriented points having the determined direction, the distance map including a tolerance radius in an area around the curve portion for identifying a group of direction-oriented points in a vicinity of the curve included in the first subset.

12. The method according to claim 8, further comprising:
determining that a length of the query curve is above a threshold length; and
in response to determining that the length of the query curve is above the threshold length, dividing the query curve into a plurality of sub-query curves, each of the plurality of sub-query curves being treated as the sketch query input.

13. The method according to claim 12, wherein the dividing is based at least in part on distinguishable strokes made when drawing the query curve.

14. The method according to claim 8, wherein using the first plurality of direction-oriented points to locate at least one down-sampled image further comprises employing an index including the second plurality of direction-oriented points as index entries associated with a plurality of down-sampled images based on the images containing salient curves having corresponding direction-oriented points.

15. The method according to claim 14, further comprising generating the index to include the second plurality of direction-oriented points as index entries, wherein the second plurality of direction-oriented points corresponds to points of resolution of an input panel of a user interface configured for receiving a sketched curve as the query curve.

16. The method according to claim 8, further comprising:
providing the at least one located down-sampled image as feedback in response to the sketch query input;
receiving a modification to the query curve;
providing different images as feedback in response to the modification to the query curve.

17. One or more computer storage media storing computer-executable instructions that, when executed on one or more processors, cause the one or more processors to perform acts comprising:
receiving a query curve as a sketch query input;
determining that a length of the query curve is greater than a threshold;
in response to determining that the length of the query curve is greater than the threshold, identifying a first portion of the query curve as a first query curve and a second portion of the query curve as a second query curve;
identifying a first plurality of direction-oriented points based at least in part on the first query curve, wherein each direction-oriented point of the first plurality of direction-oriented points specifies a position of a particular point of the sketch query input and a direction from which the first query curve passes the position; and
identifying a down-sampled image having a salient curve that includes a second plurality of direction-oriented points that match a subset of the first plurality of direction-oriented points, wherein one or more salient curves for the down-sampled image are identified by filtering image curves detected for the down-sampled image to remove image curves having a length less than a predetermined threshold.

18. The one or more computer storage media of claim 17, wherein the first plurality of direction-oriented points correspond to points of resolution of an input panel of a user interface configured to receive a sketched curve as the query curve.

19. The one or more computer storage media of claim 17, wherein the acts further comprise:
receiving at least one of a text-based query or a color-based query in conjunction with the query curve as the search query input;
identifying one or more additional images based on at least one of the text-based query or the color-based query; and
combining a ranking score of the one or more additional images with a ranking score of a plurality of images identified based on the query curve to identify a plurality of ranked images as a search result.

* * * * *